(12) United States Patent
Brandt et al.

(10) Patent No.: US 11,527,372 B1
(45) Date of Patent: Dec. 13, 2022

(54) BISTABLE RETRACTABLE BUTTONS

(71) Applicant: Apple Inc., Cupertino, CA (US)

(72) Inventors: Riley E. Brandt, Menlo Park, CA (US); Richard H. Koch, Cupertino, CA (US); Zhipeng Zhang, Santa Clara, CA (US); John C. DiFonzo, San Mateo, CA (US); Michael B. Wittenberg, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/181,748

(22) Filed: Feb. 22, 2021

Related U.S. Application Data

(63) Continuation of application No. 15/880,140, filed on Jan. 25, 2018, now Pat. No. 10,957,501.

(60) Provisional application No. 62/564,017, filed on Sep. 27, 2017.

(51) Int. Cl.
*H01H 36/00* (2006.01)
*H01H 13/84* (2006.01)
*G06F 3/02* (2006.01)

(52) U.S. Cl.
CPC ........... *H01H 13/84* (2013.01); *G06F 3/0202* (2013.01); *H01H 36/00* (2013.01); *H01H 36/004* (2013.01); *H01H 36/0073* (2013.01); *H01H 2223/052* (2013.01); *H01H 2231/002* (2013.01)

(58) Field of Classification Search
CPC ........................................ H01H 36/00–36/02
See application file for complete search history.

(56) References Cited

U.S. PATENT DOCUMENTS

| | | | |
|---|---|---|---|
| 5,768,094 A | 6/1998 | Merkel | |
| 8,735,753 B2 | 5/2014 | Hsu | |
| 8,842,073 B2 | 9/2014 | Gan et al. | |
| 9,489,017 B2 | 11/2016 | Jacobs | |
| 2015/0341030 A1 | 11/2015 | De Saulles et al. | |
| 2018/0219551 A1 | 8/2018 | Casparian et al. | |

*Primary Examiner* — Ramon M Barrera
(74) *Attorney, Agent, or Firm* — Dorsey & Whitney LLP

(57) ABSTRACT

An electronic device includes an enclosure and a keyboard positioned within the enclosure. The keyboard includes a substrate and a key mechanism. The key mechanism includes a keycap support mechanism, a keycap supported by the keycap support mechanism and movable relative to the substrate, a ferromagnetic component attached to the keycap support mechanism, and a selectively magnetizable magnet. The selectively magnetizable magnet system may include a magnetizable material and a coil configured to selectively magnetize and demagnetize the magnetizable material. The key mechanism may include a collapsible dome biasing the keycap toward the extended position.

19 Claims, 16 Drawing Sheets

BISTABLE RETRACTABLE BUTTONS

CROSS-REFERENCE TO RELATED APPLICATION(S)

This application is a continuation of U.S. patent application Ser. No. 15/880,140, filed Jan. 25, 2018, which is a nonprovisional patent application of and claims the benefit of U.S. Provisional Patent Application No. 62/564,017, filed Sep. 27, 2017 and titled "Bistable Retractable Buttons," the disclosures of which are hereby incorporated herein by reference in their entireties.

FIELD

Embodiments described herein relate to input devices, and in particular, to input devices with retractable actuation members.

BACKGROUND

Electronic devices can receive user input from a keyboard, buttons, or other input devices with movable components. For example, keyboards may include keys with keycaps that move when pressed by a user, and the motion of the keycap may trigger a connected device to perform some action or function. As another example, handheld electronic devices such as smartphones may include buttons with actuation members that move when pressed and cause the electronic device to perform some action or function. Due to the movement of keycaps or other actuation members, input devices with movable components may be larger than input devices that lack movable components.

SUMMARY

An electronic device may include an enclosure and a keyboard positioned within the enclosure. The keyboard may include a substrate, and a key mechanism comprising a keycap support mechanism, a keycap supported by the keycap support mechanism, a ferromagnetic component attached to the keycap support mechanism, and a selectively magnetizable magnet system. The selectively magnetizable magnet system includes a magnetizable material, and a coil configured to selectively magnetize and demagnetize the magnetizable material. The keycap may be bistable (that is, capable of being held in either of two positions without external force); the position of the keycap may vary as the magnetizable material is magnetized or demagnetized.

The keycap support mechanism may be a butterfly hinge comprising a first arm and a second arm coupled to the first arm by a living hinge. The ferromagnetic component may be attached to one of the first arm or the second arm. The enclosure may include a base portion housing the keyboard, and a display portion having a display housed therein. The display portion may be flexibly coupled to the base portion to enable the display portion to rotate between a closed position and an open position. The magnetizable material may be demagnetized when the display portion is in the open position, thereby allowing the keycap to move between an extended position and a retracted position, and the magnetizable material may be magnetized when the display portion is in the closed position, thereby magnetically maintaining the keycap in the retracted position. The key mechanism may further include a collapsible dome below the keycap and configured to produce an actuation signal when the keycap is in the retracted position. The electronic device may be configured to not perform a function associated with the key mechanism in response to the actuation signal when the magnetizable material is magnetized and the keycap is maintained in the retracted position. When the magnetizable material is magnetized, the magnetizable material may produce a persistent magnetic field that is maintained without a continuous application of electrical power to the coil. The collapsible dome may bias the keycap toward the extended position. The selectively magnetizable magnet system may further include first and second pole pieces positioned at opposite ends of the magnetizable material.

When the magnetizable material is magnetized, the magnetizable material may produce a persistent magnetic field that is maintained without a continuous application of electrical power to the coil. The persistent magnetic field may be a first persistent magnetic field having a first polarity, the magnetizable material may be magnetizable to produce, in a first mode, the first persistent magnetic field and, in a second mode, a second persistent magnetic field having a second polarity opposite the first polarity, and the ferromagnetic component may be a permanent magnet having a third persistent magnetic field that is attracted to the first persistent magnetic field and repelled from the second persistent magnetic field.

The ferromagnetic component may be at least partially encapsulated in the keycap support mechanism. The selectively magnetizable magnet system may be positioned below the ferromagnetic component.

The key mechanism may be a first key mechanism, and the keyboard may further include a second key mechanism. The second key mechanism may include an additional keycap, an additional keycap support mechanism movably supporting the additional keycap relative to the substrate, an additional ferromagnetic component attached to the additional keycap support mechanism, and an additional selectively magnetizable magnet system. The additional selectively magnetizable magnet system may include an additional magnetizable material, and an additional coil configured to selectively magnetize and demagnetize the additional magnetizable material.

An input device may include a support structure, an actuation member movable between an extended position with respect to the support structure and a retracted position with respect to the support structure, and a support mechanism supporting the actuation member above the support structure. The input device may also include a ferromagnetic material attached to the support mechanism and a selectively magnetizable magnet system. The selectively magnetizable magnet system may be configured to, in a first mode, produce a persistent magnetic field that magnetically attracts the ferromagnetic material, thereby retracting the actuation member to the retracted position. In a second mode, the selectively magnetizable magnet system may allow the actuation member to move from the retracted position to the extended position.

The selectively magnetizable magnet system may include a magnetizable material, and a coil configured to, in the first mode, magnetize the magnetizable material to produce the persistent magnetic field. The coil may be configured to, in the second mode, substantially demagnetize the magnetizable material. The magnetizable material may be an aluminum nickel cobalt iron material or a chromium cobalt iron material.

The ferromagnetic material may be a permanent magnet, the persistent magnetic field may be a first persistent magnetic field having a first polarity configured to attract the permanent magnet, and the coil may be configured to, in the second mode, magnetize the magnetizable material to produce a second persistent magnetic field configured to repel the permanent magnet. The first persistent magnetic field and the second persistent magnetic fields may be maintained without a continuous application of electrical power to the selectively magnetizable magnet system.

The input device may further include a collapsible dome configured to bias the actuation member to the extended position, and the collapsible dome may collapse in response to an actuation force applied to the actuation member, thereby closing an electrical circuit to signal actuation of the input device.

An electronic device may include an enclosure, a cover attached to the enclosure and defining an opening, a keycap positioned within the opening, a ferromagnetic component affixed to the keycap, a permanent magnet below the ferromagnetic component, and a shunt movable between a first position and a second position relative to the permanent magnet. In the first position, the keycap may be movable between an extended position and a retracted position, and in the second position, magnetic attraction between the ferromagnetic component and the permanent magnet may maintain the keycap in the retracted position. In the first position, the shunt may be closer to the permanent magnet than in the second position.

The electronic device may further include a biasing mechanism configured to bias the keycap toward an extended position relative to the cover. When the shunt is in the first position, a magnetic attraction between the permanent magnet and the ferromagnetic component may be less than a biasing force of the biasing mechanism. When the shunt is in the second position, a magnetic attraction between the permanent magnet and the ferromagnetic component may be greater than the biasing force of the biasing mechanism.

The enclosure may include a base portion housing the keyboard, and a display portion housing a display and flexibly coupled to the base portion to enable the display portion to rotate between a closed position and an open position. When the display portion is in the open position, the shunt may be in the first position, and when the display portion is in the closed position, the shunt may be in the second position.

The electronic device may further include an actuator configured to move the shunt from the second position to the first position in response to the display portion being moved from the closed position to the open position.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
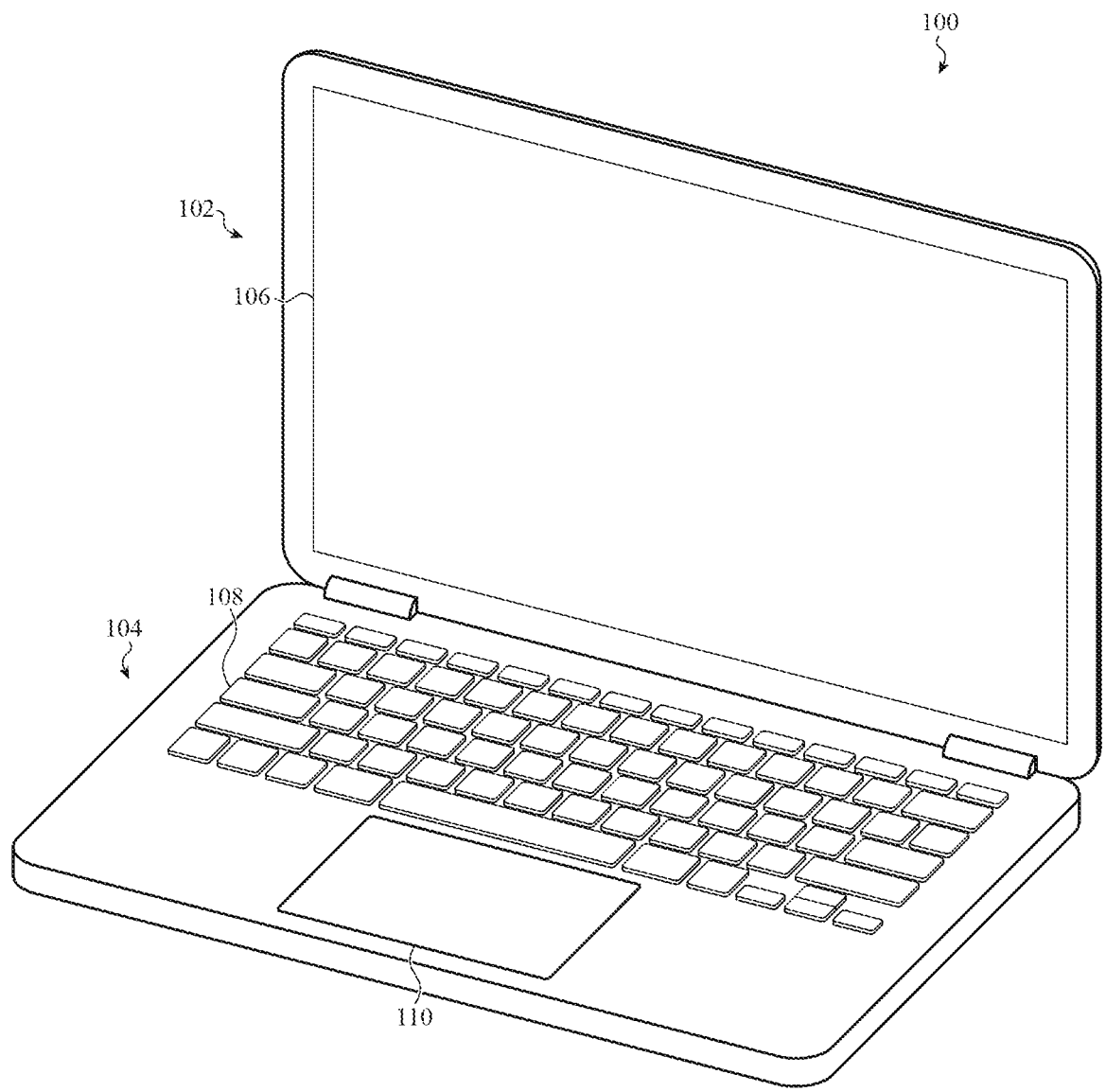
FIG. 1 depicts an example electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to input devices, such as buttons and keyboard keys, that include bistable moveable actuation members. Due to the movement afforded by these devices, however, they may be less compact than certain types of non-moving input devices (e.g., touch sensitive surfaces, such as touch sensors or other nonmoving input devices). Accordingly, described herein are bistable, movable input devices that may be maintained in a retracted position in certain modes to reduce the overall size or height of the input device. The moveable actuation members (e.g., input devices) as "bistable" insofar as they may occupy either of two distinct positions (e.g., extended or retracted) in the absence of any external force exerted on the actuation members. An actuation member may be held in a retracted position by a magnet within the embodiment or may be biased to an extended position by a dome, spring or other biasing mechanism if the magnet is demagnetized.

For example, a notebook computer may include a built-in keyboard with multiple individual movable keys. While the keys may need to be free to move when the computer is in use (e.g., to allow a user to type), the additional height requirements of the movable keys leads to a larger overall device size. Accordingly, described herein are key retraction systems and methods by which the keys may be retracted when the device is being stored (or in other modes). For example, the keys of the keyboard may include a magnetizable material that can be selectively magnetized to either attract or not attract (or repel) a keycap. When the selectively magnetizable material is magnetized to attract the keycap, the keycap may be held in a retracted state, thus reducing the overall size and/or height of the keyboard. Otherwise, the keycap may occupy an extended position. Further, because the selectively magnetizable material may maintain a persistent magnetic field without continuous electrical input, the keys may be maintained in the retracted state without a continuous application of electricity, which may be especially helpful in devices that are configured to operate on batteries and thus have limited onboard power supplies. Accordingly, the key may be considered bistable—it may occupy an extended or retracted state without continuous application of electricity or an external force.

Other techniques for magnetically maintaining keycaps (or other actuation members) in a retracted state are also described. For example, instead of magnetizing and demagnetizing (or reversing the polarity) of a magnetizable material, a permanent magnet may be movable into a position in which the keycap is magnetically attracted to the permanent magnet. When the key is in an operational state, the permanent magnet may be moved to a different position where the magnetic attraction is reduced and the key is allowed to operate normally. Other key retraction systems and techniques for selectively retracting keys and other actuation members are also described herein.

In addition to retracting keyboard keys, the retraction systems and techniques described herein may also be used for other types of input devices. For example, buttons of handheld electronic devices, such as smartphones, may be more easily located and manipulated if they protrude slightly from the housing. However, protruding buttons may catch or snag on fabric or other materials when stored (e.g., in a pocket, briefcase, purse, etc.), increase the size of the device, and may be prone to damage from impacts or other interference. Accordingly, the concepts described herein may be incorporated into buttons for handheld electronic devices, or into other types of input devices in other electronic devices.

FIG. 1 depicts an electronic device 100 that may use bistable, retractable key mechanisms as described herein. The electronic device 100 is depicted as a notebook computer, though this is merely one example electronic device that may incorporate retractable key mechanisms as described herein. Accordingly, the concepts discussed herein may apply equally or by analogy to other electronic devices, including mobile phones (e.g., smartphones), wearable electronic devices (e.g., watches, fitness trackers, biometric sensors), head-mounted displays, digital media players (e.g., mp3 players), or the like.

The electronic device 100 includes an enclosure that includes a base portion 104 and a display portion 102. The display portion 102 may include a cover 106, such as a glass, plastic, ceramic, or other substantially transparent material, component, or assembly, attached to the display portion 102 and covering a display that is housed in the display portion. The display portion 102 may be flexibly coupled to the base portion 104 to enable the display portion 102 to rotate between a closed position and an open position. For example, the display portion 102 may be coupled to the base portion 104 via one or more hinges, living hinges, or other flexible components. The display portion 102 may be rotated about a pivot defined by the hinge (or may articulate through any suitable path) between an open position in which the display is visible to a user, and a closed position in which the display portion 102 is folded against (e.g., substantially parallel to) the base portion 104. In the closed position, the display portion 102 may cover a keyboard 108 of the device 100. As described herein, the keys (or keycaps) of the keyboard 108 may be configured to be magnetically maintained in a retracted position when the display portion 102 is in the closed position. This may allow the device 100 (and the base portion 104 in particular) to be made thinner, as empty, unused space that was formerly required to allow for the travel of the individual keys may be eliminated during storage.

The base portion 104 may include a keyboard 108 that includes a plurality of key mechanisms (which may be referred to herein simply as "keys"). The keyboard 108 is configured to receive typing inputs via the keys. As described herein, the keys may include keycaps or other input components that are movable relative to a substrate or other base structure when pressed by a user. The motion or travel of the keycaps may actuate or otherwise manipulate a switch (e.g., a collapsible dome switch) that is detectable by the device 100 and that causes the device 100 to register a key press. As described herein, the keycaps may be selectively retractable so that in some modes of operation, the keycaps are allowed to move between an extended position and a retracted position (e.g., to accept typing inputs), and in other modes of operation, the keycaps are magnetically maintained in the retracted position. For example, the device 100 may detect when the display portion 102 is closed or is being moved towards a closed position (e.g., with proximity sensors, motion sensors, encoders, or the like), and may cause the retractable keys of the keyboard 108 to be retracted (using any of the retractable key mechanisms described herein).

The base portion 104 may also include other input regions. For example, the electronic device 100 may include, in the base portion 104, a trackpad 110 that is configured to receive touch and/or force based inputs, such as taps, swipes, gestures, multi-finger inputs, clicks, or the like.

Figure 2A:
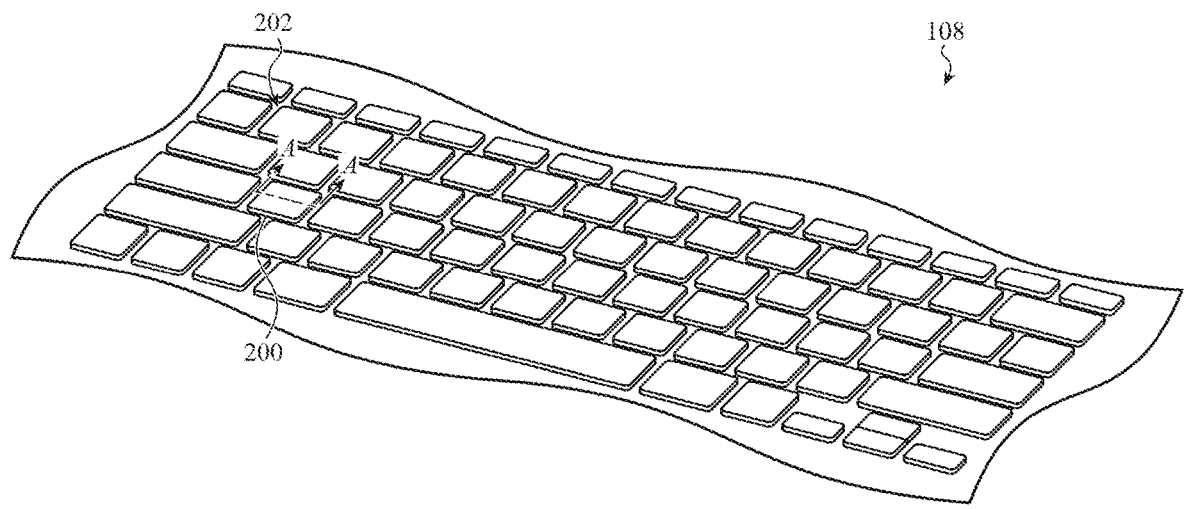
FIG. 2A depicts a keyboard of the electronic device of FIG. 1 in a first mode of operation.
Figure 2B:
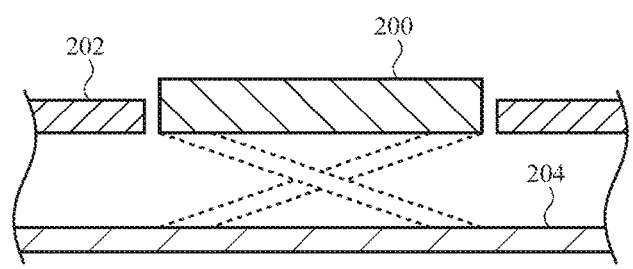
FIG. 2B depicts a partial cross-sectional view of the keyboard of FIG. 2A.

FIGS. 2A-2D illustrate the keyboard 108 in various modes. For example, FIGS. 2A-2B show a perspective and partial cross-sectional view, respectively, of the keyboard 108 in a first operational state in which the keycaps of the individual keys are movable between an extended position and a retracted position. In this mode, in a rest or unactuated state, the individual keys may extend or protrude above a key web 202. By extending above the key web 202, the keys may be tactilely distinguished from one another by the gap between the protruding keycaps, and therefore may be more easily and quickly located by a user simply by touch. Further, in this mode, the keys may be actuated in a conventional fashion. In particular, a force applied to the keycap may cause the keycap to deflect downwards towards a supporting structure or member (e.g., a substrate 204) to a retracted position, and somewhere during or at the end of the downward travel a switch (e.g., a collapsible dome) may be actuated to cause the device 100 to register an actuation of the key.

FIG. 2B shows a partial cross-sectional view of the keyboard 108, viewed along line A-A in FIG. 2A, showing the position of the keycap 200 relative to the key web 202 when the key is in an unactuated or extended position. The keycap 200 may be supported by a keycap support mechanism 206, which may be any suitable structure or mechanism that movably supports the keycap 200 relative to a substrate. For example, the keycap support mechanism 206 may be a scissor mechanism, a butterfly hinge, or the like. The keycap support mechanisms shown herein are butterfly hinges, though other keycap support mechanisms may be substituted for the butterfly hinges.

Figure 2C:
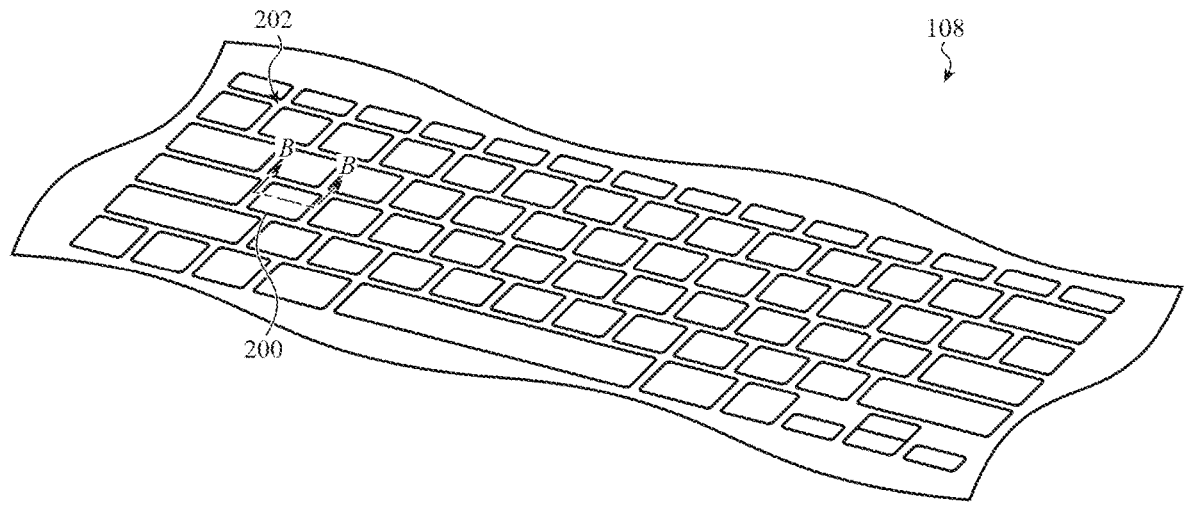
FIG. 2C depicts the keyboard of the electronic device of FIG. 1 in a second mode of operation.
Figure 2D:
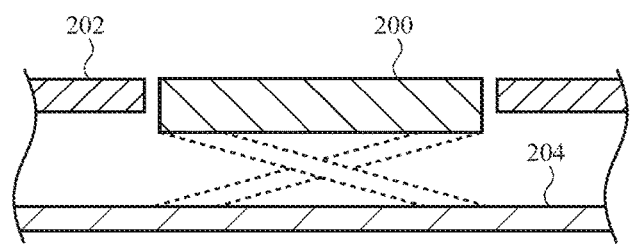
FIG. 2D depicts a partial cross-sectional view of the keyboard of FIG. 2C.

FIGS. 2C-2D show a perspective and partial cross-sectional view, respectively, of the keyboard 108 in a second operational state in which the keycaps of the individual keys are maintained in a retracted position. For example, as shown in FIG. 2D, which shows a partial cross-sectional view of the keyboard 108 viewed along line B-B in FIG. 2C, a top surface of the keycap 200 is substantially flush with a top surface of the key web 202. (In other cases, the top surface of the keycap 200 may be below or recessed relative to the top surface of the key web 202.) The keys of the keyboard 108 may be maintained in the position shown in FIGS. 2C-2D in various ways and for various purposes. For example, the device 100 may include permanent magnets or selectively magnetizable magnet systems that magnetically maintain the keys in the retracted position. As another example, piezoelectric actuators may be used to maintain the keys in the retracted position. The keys may be maintained in the retracted position, for example, when the device is closed (e.g., when the display portion 102 is in a closed position).

Figure 3A:
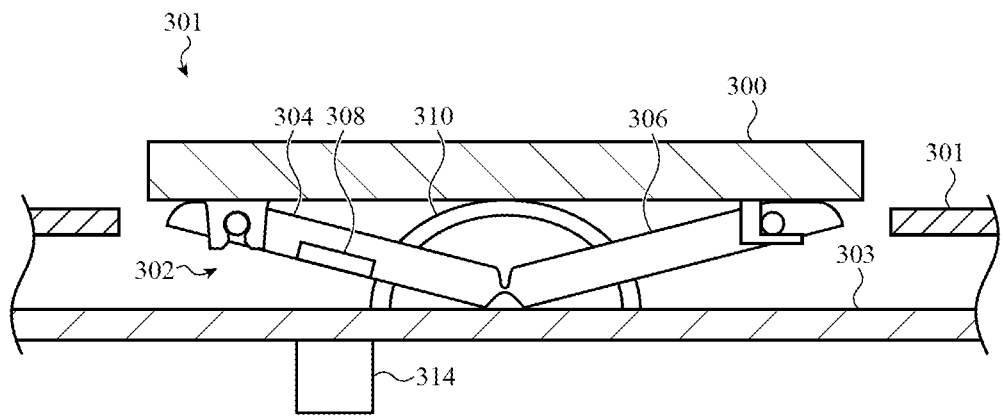
FIG. 3A depicts a partial cross-sectional view of a retractable key mechanism in a first mode of operation.
Figure 3B:
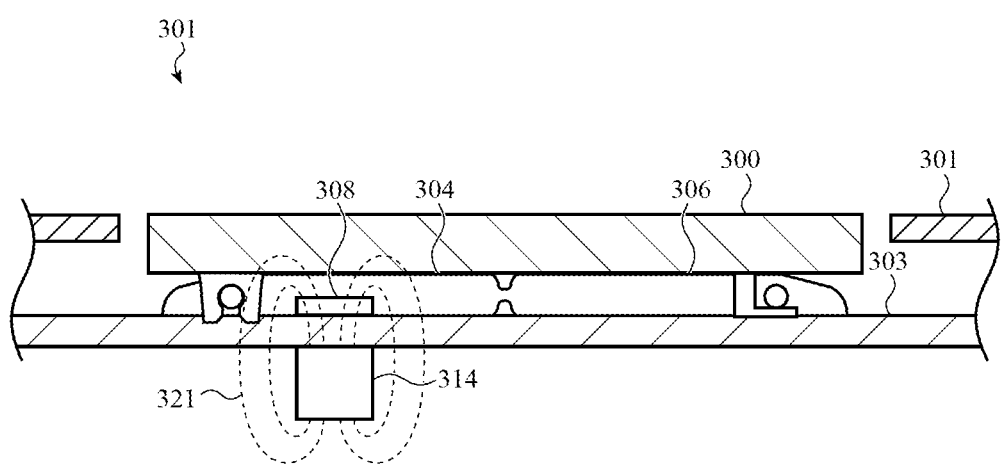
FIG. 3B depicts a partial cross-sectional view of the retractable key mechanism of FIG. 3A in a second mode of operation.

FIGS. 3A-3B are partial cross-sectional views of an example bistable, retractable key mechanism 301 that uses a selectively magnetizable magnet system to allow the key mechanism to operate in a normal (e.g., extended) mode and a retracted mode, as described herein. The key mechanism 301 includes a keycap 300 that is movably supported above a substrate 303 by a keycap support mechanism 302 (which may be pivotally coupled to a support body 309, FIG. 4, which may in turn be attached to the substrate 303).

Figure 3C:
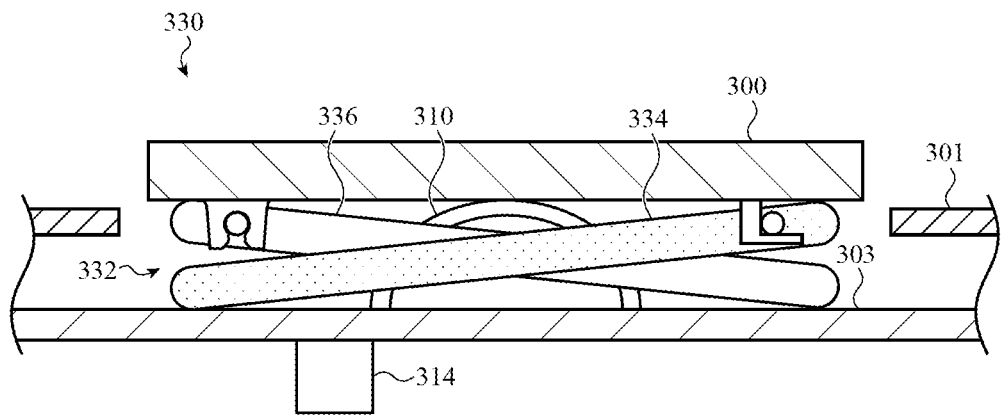
FIG. 3C depicts a partial cross-sectional view of another retractable key mechanism in a first mode of operation.
Figure 3D:
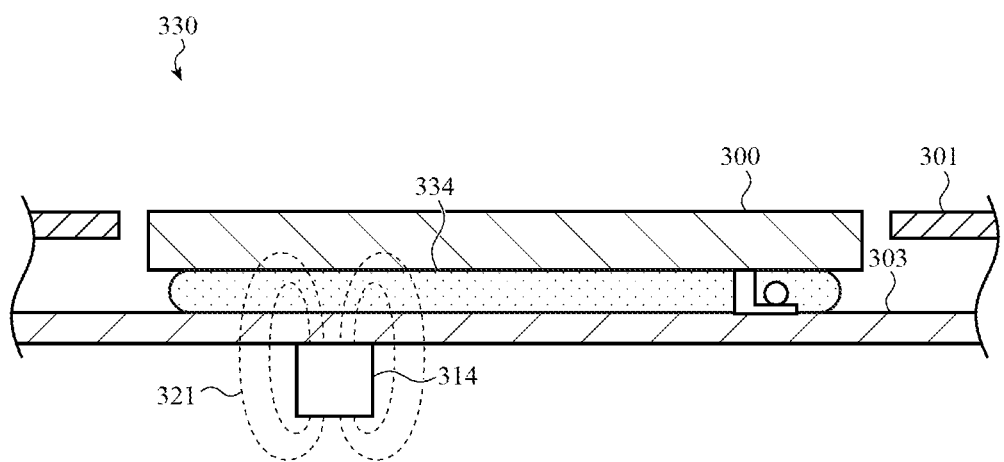
FIG. 3D depicts a partial cross-sectional view of the retractable key mechanism of FIG. 3C in a second mode of operation.

The keycap support mechanism 302 is represented in FIGS. 3A-3B as a butterfly hinge (e.g., a hinge with two wings that are flexibly coupled to one another via a living hinge or gear hinge), though other keycap support mechanisms may also be used, such as a scissor mechanism. FIGS. 3C-3D show an example retractable key mechanism that uses a scissor mechanism. The keycap support mechanism 302 includes first and second arms 304, 306 that pivot with respect to one another to allow the keycap 300 to be moved downwards in response to an actuation force.

The keycap 300 may be biased towards an extended position (e.g., an unactuated position) by a biasing mechanism. As shown in FIGS. 3A-3B, the biasing mechanism is a collapsible dome 310, though other biasing mechanisms may be used instead of or in addition to the collapsible dome 310, such as springs (e.g., coil springs, flat springs, etc.), opposing magnets, or the like.

The key mechanism may also include a ferromagnetic component 308 incorporated with the keycap support mechanism 302 or the keycap 300, and positioned relative to a selectively magnetizable magnet system 314 so that the selectively magnetizable magnet system 314 can magnetically interact with the ferromagnetic component 308. In particular, the selectively magnetizable magnet system 314 may be configured to magnetically attract the ferromagnetic component 308 to retract the keycap 300 (e.g., draw the keycap 300 downward as shown in FIG. 3B). Accordingly, the ferromagnetic component 308 may be attached to or incorporated with any component of the key mechanism or positioned at any location that will pull the keycap 300 downward when the ferromagnetic component 308 is subjected to a magnetic field by the selectively magnetizable magnet system. For example, the ferromagnetic component 308 may be attached to or incorporated with the keycap 300. In some cases, the keycap 300 and/or the keycap support mechanism 302 (or any other suitable component of the key mechanism) may be formed partially or entirely from a ferromagnetic material.

As used herein, the term "ferromagnetic" encompasses materials that react strongly to a magnetic field, including soft and hard magnetic materials. Soft magnetic materials may be affected by an external magnetic field but may not be permanently magnetized by such a field and may not be magnetic in the absence of any such field. Hard magnets, including materials such as ferrite, neodymium iron boron (NdFeB), and samarium-cobalt (SmCo), are permanent magnets and may themselves generate a magnetic field.

The ferromagnetic component 308 may be formed from any suitable material that reacts strongly to a magnetic field. For example, the ferromagnetic component 308 may be formed from a magnetic material that is not magnetized under normal operating conditions (e.g., it does not propagate a substantial magnetic field), but is attracted to other magnets. For example, the ferromagnetic component 308 may be steel, iron, cobalt, nickel, an alloy, a soft magnetic material, or the like. In some cases, the ferromagnetic component 308 may be a material that can form a permanent magnet (or maintain a persistent magnetic field without a continuous application of energy), such as a hard magnetic material, a ceramic magnet, an aluminum nickel cobalt iron (AlNiCo) magnet, a samarium-cobalt (SmCo) magnet, a ferrite magnet, a neodymium iron boron (NdFeB) magnet, or any other suitable permanent magnet material. In the latter case, the ferromagnetic component 308 may be magnetized (e.g., it may be a permanent magnet that produces a magnetic field in the absence of an external influence).

The key mechanism also includes or is associated with a selectively magnetizable magnet system 314 that may be switched between various modes or states of magnetism. As described herein, the selectively magnetizable magnet system 314 may include a magnetizable material and a coil. The magnetizable material may have a suitably low coercivity that the coil can selectively magnetize the magnetizable material so that the magnetizable material produces a persistent magnetic field. Once magnetized (e.g., once the magnetizable material is magnetized to produce a persistent magnetic field), the coil may demagnetize the magnetizable material (or reverse the polarity or change the strength of the original magnetic field).

As shown in FIG. 3A, when the selectively magnetizable magnet system 314 is operated in a first mode, the selectively magnetizable magnet system 314 may produce no magnetic field (or may produce a repulsive magnetic field or a magnetic field that is not sufficiently strong to retract the keycap 300 or maintain the keycap 300 in a retracted position). In such cases, the keycap may be allowed to move between the extended and retracted position, to allow the key to be used to receive inputs from a user. As noted above, the selectively magnetizable magnet system 314 may be in the first mode when the display portion of an electronic device (e.g., the display portion 102, FIG. 1) is in an open position.

As shown in FIG. 3B, the selectively magnetizable magnet system 314 may also be operated in a second mode in which the selectively magnetizable magnet system 314 produces a persistent magnetic field 321 that attracts the ferromagnetic component 308. The persistent magnetic field 321 may have sufficient strength to overcome the biasing force produced by the biasing mechanism (e.g., the collapsible dome 310), thereby retracting the keycap 300 into the retracted position. The persistent magnetic field 321 may also be sufficiently strong to magnetically maintain the keycap 300 in the retracted position. As noted above, the selectively magnetizable magnet system 314 may be in the second mode when the display portion of an electronic device (e.g., the display portion 102, FIG. 1) is in a closed position (or when it is being moved into the closed position), such as when the device is being stored or is otherwise inactive. In some cases, as described herein, the selectively magnetizable magnet system of a given key may be in the second mode (and the keycap therefore retracted) while other keys are not retracted.

FIGS. 3C-3D are partial cross-sectional views of an example bistable, retractable key mechanism 330 that uses a selectively magnetizable magnet system to allow the key mechanism to operate in a normal (e.g., extended) mode and a retracted mode, as described herein. The key mechanism 330 includes the keycap 300 and the substrate 303. While alike to the retractable key mechanism 301 in other respects, the retractable key mechanism 330 has a scissor mechanism 302 for its keycap support mechanism instead of a butterfly hinge (as shown in FIGS. 3A-3B). The scissor mechanism 332 may include a first arm 334 and a second arm 336, which are pivotally coupled to one another to movably support the keycap 300 relative to the substrate 303.

Similar to the key mechanism 301, a ferromagnetic material may be incorporated with the scissor mechanism 332 to allow the scissor mechanism 332 to be magnetically attracted to the selectively magnetizable magnet system 314 (or magnetically repelled from the selectively magnetizable magnet system 314, depending on the configuration of the selectively magnetizable magnet system 314 and the configuration of the ferromagnetic material). The ferromagnetic material may be a soft magnetic material or a hard magnetic material, and may be incorporated into the scissor mechanism 332 in any suitable way. For example, a ferromagnetic component (e.g., a piece of steel, a permanent magnet, etc.) may be attached to one or both of the arms 334, 336 of the scissor mechanism 332. In such cases, the component may be attached in any suitable way, such as by encapsulating the component in a material of the arms 334, 336, adhering and/or mechanically engaging the component to an arm, or the like.

As another example, one or both of the arms may be formed partially or entirely of a ferromagnetic material. FIGS. 3C-3D, for example, show a scissor mechanism 332 in which the first arm 334 is formed entirely of a ferromagnetic material (e.g., unmagnetized metal, a permanent magnet, or the like). As described above, when the selectively magnetizable magnet system 314 is operated in a first mode (FIG. 3C), the selectively magnetizable magnet system 314 may produce no magnetic field (or may produce a repulsive magnetic field or a magnetic field that is not sufficiently strong to retract the keycap 300 or maintain the keycap 300 in a retracted position). In such cases, the keycap may be allowed to move between the extended and retracted position, to allow the key to be used to receive inputs from a user. As shown in FIG. 3D, the selectively magnetizable magnet system 314 may also be operated in a second mode in which the selectively magnetizable magnet system 314 produces a persistent magnetic field 321 that attracts the ferromagnetic material of the first arm 334 (which, as shown, may be entirely formed of ferromagnetic material).

The second arm 336 may also be formed partially or entirely of a ferromagnetic material, which may be the same material or a different material as that of the first arm 334. For example, the first arm 334 may be a permanent magnet having a first polarity of a first strength, and the second arm 336 may be a permanent magnet having a different polarity and optionally a different strength. As another example, the first arm 334 may be a non-magnetized magnetic material and the second arm 336 may be a permanent magnet. Other possible configurations are also contemplated.

Figure 4:
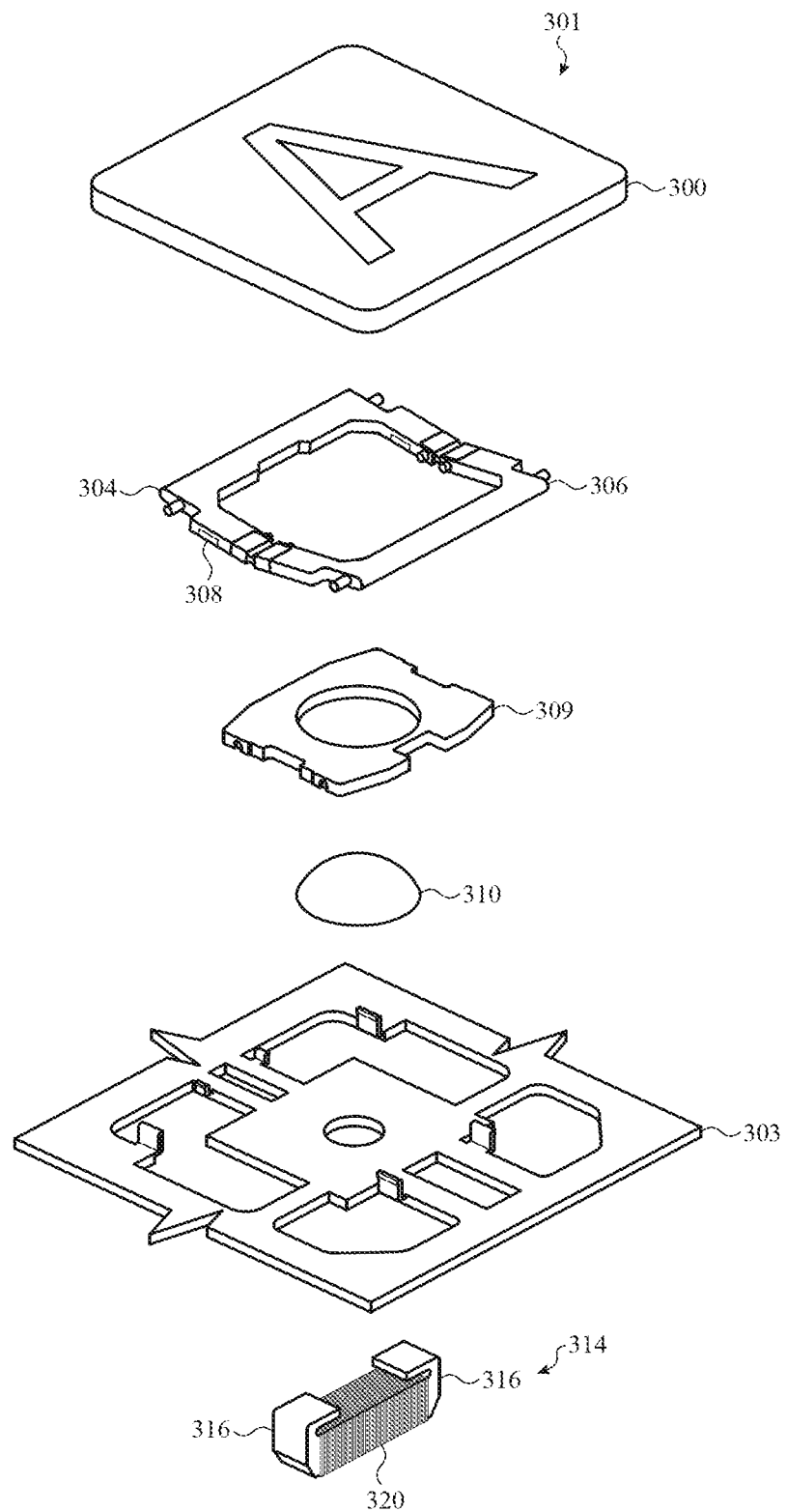
FIG. 4 depicts an exploded view of an example retractable key mechanism.

FIG. 4 is an exploded view of the retractable key mechanism 301 of FIGS. 3A-3B. As noted, the retractable key mechanism 301 includes a keycap 300 that is movably supported above a substrate 303 by a keycap support mechanism 302 (shown as a butterfly hinge). The keycap support mechanism 302 may be pivotally coupled to a support body 309, which is attached (e.g., adhered, heat staked) to an underlying substrate 303 or other support structure. In key mechanisms that use other types of keycap support mechanisms (e.g., scissor hinges), the support body 309 may be omitted and the support mechanism may be attached to the substrate 303 or other support structure directly or in any other suitable manner.

The substrate 303 may be a portion of a support plate that acts as a support structure or substrate for multiple key mechanisms. For example, the substrate 303 may be a plate that supports all or a group of the keycaps of a complete keyboard.

In some cases, the substrate 303 is a circuit board (e.g., a printed circuit board) to which the keycap support mechanism 302 is attached (directly or via the support body 309). The circuit board may also include electrical traces that are electrically coupled to a collapsible dome (e.g., the dome 310) or other electrical switching component, as well as other electrical contacts, interconnects, and the like. The electrical traces may operate in conjunction with the collapsible dome to produce actuation signals or other detectable phenomena indicating when a key or other actuation member is depressed. For example, when the collapsible dome is collapsed or deformed, it may produce an actuation signal that indicates to the device that an input has been received and causes the device to take an action or perform a function associated with the key. The dome 310 may produce the actuation signal, for example, by closing an electrical circuit between two traces or contacts on the circuit board. The action or function that is associated with the key and performed by the device in response to the actuation signal may be any suitable action or function, such as a function that is indicated or suggested by information on the keycap 300. For example, if the keycap includes a glyph of a letter (e.g., a letter-input function), actuation of that key may cause the device to register the selection of that letter, and may cause the letter to be displayed on a display. If the keycap includes a glyph indicating a media control function (e.g., a triangular "play" symbol), actuation of that key may cause the device to begin playing music. Key functions may be indicated in other ways than keycap glyphs. For example, information displayed on a display may indicate what function a particular key will trigger or initiate upon actuation of that key.

Where the keycap support mechanism 302 is coupled to the substrate 303 by a support body, the support body may be affixed to the substrate 303 via adhesive, heat staking, or the like, and the keycap support mechanism 302 may attach to the support body. In other cases, the key mechanism 301 includes separate substrates for the electrical paths and for connecting to the keycap support mechanism. For example, a substrate or other component to (e.g., a metal frame or plate) to which keycap support mechanisms are coupled may be above or below a separate circuit layer to which a dome (or other switching component) may be electrically coupled.

The keycap support mechanism 302 includes first and second arms 304, 306, which may be pivotally coupled to one another. The keycap support mechanism 302 includes one or more ferromagnetic components 308 attached to the first arm 304. The ferromagnetic components 308 may be attached to or integrated with the keycap support mechanism 302 in any suitable way. For example, it may be adhered to the first arm 304, mechanically retained to the first arm 304 via clips or other engagement features, fully or partially encapsulated in the material of the first arm 304 (e.g., by insert molding), or any other suitable technique. Also, as noted above, ferromagnetic components may instead be coupled to or otherwise incorporated with the keycap 300 or any other component of the key mechanism 301. The ferromagnetic component 308 may be located on the first arm 304 nearer the substrate than the keycap (or nearer the end that is proximate the living hinge than the end that is proximate the keycap), which may exert greater advantage on the first arm 304 for a given magnetic attraction than locating the ferromagnetic component 308 nearer the keycap.

The key mechanism 301 also includes the selectively magnetizable magnet system 314 positioned relative to the ferromagnetic component(s) 308. The selectively magnetizable magnet system 314 may include a coil 320, a magnetizable material 318 (separately identified in FIG. 5A, and which may be at least partially encircled by the coil 320), and pole pieces 316. The magnetizable material 318 may be a material that can be selectively magnetized by the coil 320 to various persistent states of magnetism (e.g., various strengths and/or polarities of magnetic field, including substantially no magnetic field). For example, the coil 320 may be energized with an electric current (e.g., a DC current) that produces a coercing magnetic field. Magnetic domains in the magnetizable material 318 may align with the coercing magnetic field, and remain aligned when the electric current is removed and the coercing magnetic field disappears. The magnetized magnetizable material 318 thus remains magnetized without continuous application of power to the coil 320, and the magnetic field produced by the magnetizable material 318 persists (e.g., it produces a persistent magnetic field). The persistent magnetic field induced in the magnetizable material 318 may have a polarity that attracts the ferromagnetic component(s) 308. For example, if the ferromagnetic component(s) 308 include a non-magnetized material, the persistent magnetic field induced in the magnetizable material 318 may be of any polarity, as the ferromagnetic component(s) 308 will be attracted to any field. If the ferromagnetic component(s) 308 are permanent magnets, the persistent magnetic field induced in the magnetizable material 318 may have a polarity that is opposite to the permanent magnets, or otherwise oriented to attract the permanent magnets.

In order to demagnetize the magnetizable material 318, the coil 320 may be energized with another electric current (e.g., an AC current). This may cause the magnetic domains in the magnetizable material 318 to become misaligned, and may result in the magnetizable material 318 having substantially no residual magnetic field, or a field that is weak enough not to interfere with the normal operation of the key mechanism.

The electric currents supplied to the coil 320 may be supplied for any suitable duration, and having any suitable electrical characteristic (e.g., voltage, current, power, waveform, etc.). In some cases, the coils are energized for about 100 milliseconds or less, which may provide a suitable coercing magnetic field to magnetize or demagnetize the magnetizable material 318. In some cases, a coil 320 uses about 1 millijoules or less of energy per instance of magnetizing or demagnetizing the magnetizable material 318.

The selectively magnetizable magnet system 314 may also include pole pieces 316 that direct or shape the magnetic field of the magnetizable material 318. For example, the pole pieces 316, which may be formed of a ferritic or ferromagnetic material, may concentrate or direct the magnetic field produced by the magnetizable material to a location proximate the ferromagnetic components 308 to help increase the strength of attraction between the magnetizable material 318 and the ferromagnetic components 308. In this way, the pole pieces 316 may also decrease the required strength of the magnetic field as compared to a selectively magnetizable magnet system 314 that does not include pole pieces.

Figure 5A:
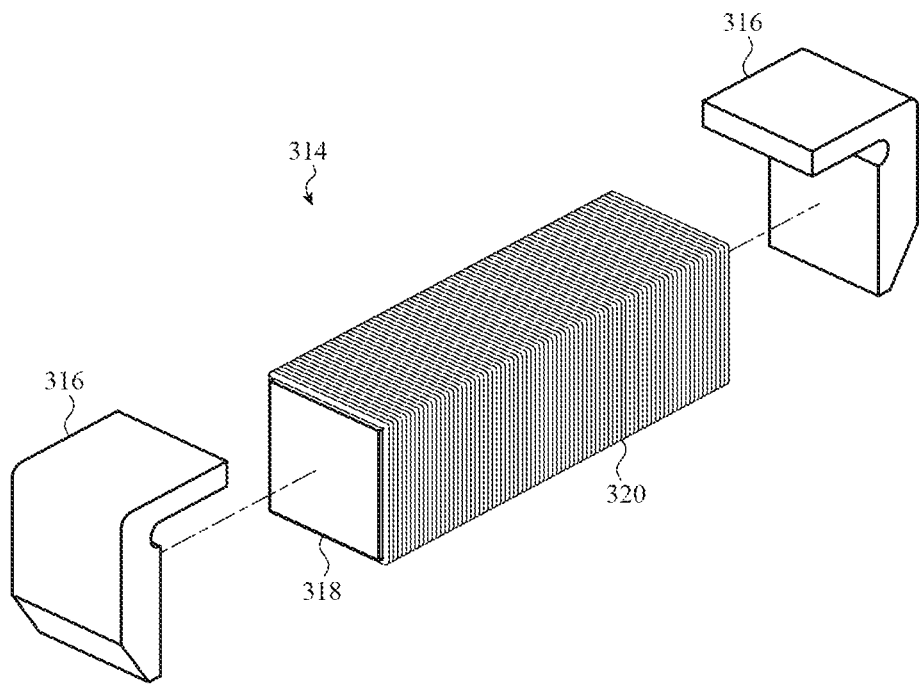
FIGS. 5A-5B depict first and second examples, respectively, of selectively magnetizable magnets.

FIG. 5A is an exploded view of the selectively magnetizable magnet system 314. The selectively magnetizable magnet system 314 may include the magnetizable material 318, the coil 320, and the pole pieces 316. The magnetizable material 318 may be any suitable material that can be magnetized by the coil to produce a persistent magnetic field. For example, the magnetizable material 318 may be an aluminum nickel cobalt iron (AlNiCo) magnet, an iron chrome cobalt (FeCrCo) magnet, or any other suitable material. The magnetizable material 318 may have any suitable shape, such as a cuboid, a cylinder, or the like.

In some cases, the selectively magnetizable magnet system 314 may include multiple magnetic materials within the coil 320. For example, the selectively magnetizable magnet system 314 may include a first magnetic material that can be selectively magnetized and/or demagnetized by the coil, and a second magnetic material that is less easily magnetized, and which may not significantly change its magnetic properties when subjected to a coercing field. In such cases, the coil 320 may be used to switch the polarity of the first magnetic material between two polarities—one in which the magnetic fields of the first and second materials interact such that the selectively magnetizable magnet system 314 does not produce a substantial magnetic field, and another in which the magnetic fields interact such that the selectively magnetizable magnet system 314 does produce a magnetic field sufficient to attract the ferromagnetic component 308.

The coil 320 may include multiple turns of a conductive wire, such as a copper wire. The coil 320 may be electrically connected to a power source that provides a suitable electrical current to selectively magnetize and demagnetize the magnetizable material 318, as described herein.

The pole pieces 316 may be attached to or placed proximate the ends of the magnetizable material 318, and may concentrate or direct the magnetic flux into a position or orientation that is advantageous for attracting (or in some cases repelling) the ferromagnetic component 308. The pole pieces 316 may be formed from any suitable material, such as steel, iron, or the like.

Figure 5B:
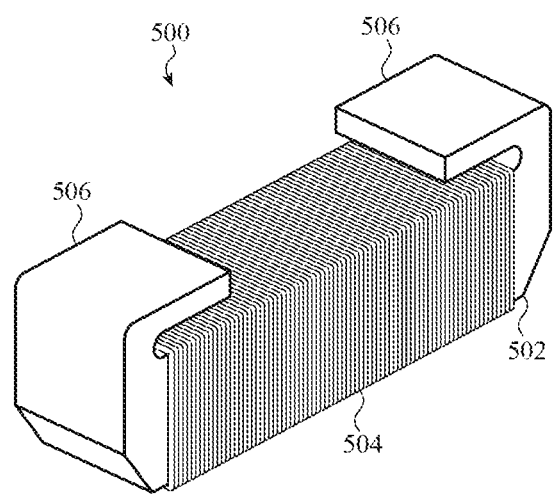

FIG. 5B shows another example selectively magnetizable magnet system 500 that uses a monolithic magnetizable material 502 having a more complex geometry than a simple cuboid or cylinder. For example, the magnetizable material 502 may have a central portion (around which a coil 504 is wound), and flux directing portions 506 that concentrate or direct the magnetic flux into a position or orientation that is advantageous for attracting (or in some cases repelling) the ferromagnetic component 308. Other shapes and configurations for the magnetic material of a selectively magnetizable magnet system are also contemplated.

While the foregoing discussion relates primarily to techniques for retracting a keycap and maintaining the keycap in a retracted position, selectively magnetizable magnet systems may also be used to change the force response of keys during actuation. For example, as described in greater detail herein, selectively magnetizable magnet systems may be used to increase the force required to actuate a key by producing a persistent magnetic field that repels a permanent magnet incorporated with the keycap or the keycap support mechanism. As another example, a magnetizable material of a selectively magnetizable magnet system may be magnetized so that it attracts a ferromagnetic component with enough force to reduce the actuation force of the key, but is not sufficiently strong to overcome the biasing force of the biasing mechanism, and thus does not retain the keycap in the retracted position when the key is pressed. In these implementations, the selectively magnetizable magnet system may be magnetized during only a portion of a keystroke to shape the force response of the key in varied ways.

The configurations of selectively magnetizable magnet systems described above facilitate the positioning of individual (or all) keys of a keyboard in different positions or operating states without requiring a constant application of power. Instead of or in addition to the selectively magnetizable magnet systems, permanent magnets may be used to produce similar results. For example, FIGS. 6A-6B are partial cross-sectional views of a keyboard that uses a movable permanent magnet instead of the selectively magnetizable magnet systems described above to allow a key mechanism to operate in a normal operational mode (e.g., where the key can be pressed down and then return to an unactuated state) and a retracted mode (e.g., where the key is maintained in a retracted state).

Figure 6A:
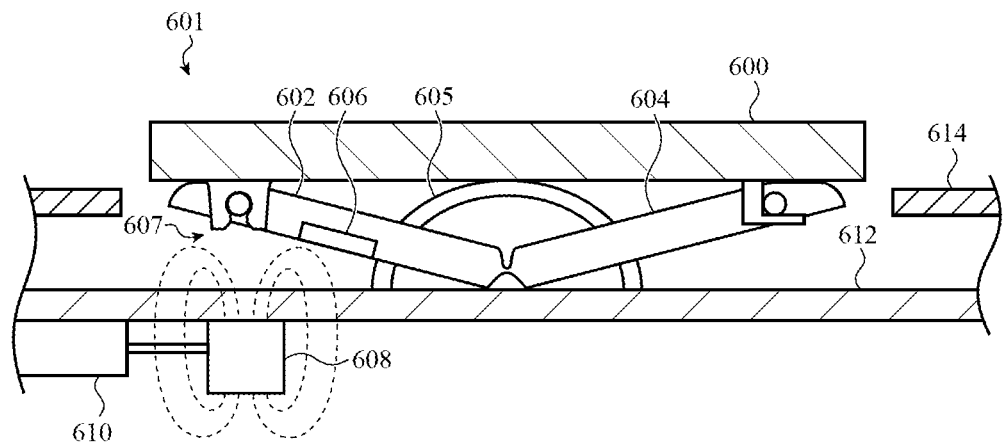
FIG. 6A depicts a partial cross-sectional view of another example retractable key mechanism in a first mode of operation.

As shown in FIG. 6A, a key mechanism 601 may include a keycap 600 that, in an extended position, extends or protrudes above a key web 614. Like other key mechanisms described herein, the keycap 600 may be movably supported above a substrate or support structure (here a substrate 612) by a keycap support mechanism 607 that includes arms 602, 604. The key mechanism 601 also includes one or more ferromagnetic components 606 incorporated with the keycap 600 or the keycap support mechanism 607. As shown, the ferromagnetic component(s) 606 are connected to an arm 604 of the keycap support mechanism 607. The ferromagnetic component(s) 606 may be the same or similar to the ferromagnetic component 308 discussed above. For example, the ferromagnetic component(s) 606 may be a ferromagnetic material that is substantially unmagnetized, or it may be a permanent magnet.

The key mechanism 601 may also include a permanent magnet 608 and an actuator 610. The actuator 610 may move the magnet 608 between a first position in which the magnet is separated from the ferromagnetic component 606 by a sufficient distance that the keycap 600 is allowed to move between a retracted and an extended position. For example, in the first position, the magnetic attraction between the magnet 608 and the ferromagnetic component 606 may be lower than a biasing force provided by a biasing mechanism (e.g., the collapsible dome 605), such that the keycap will return to the extended position after being depressed.

Figure 6B:
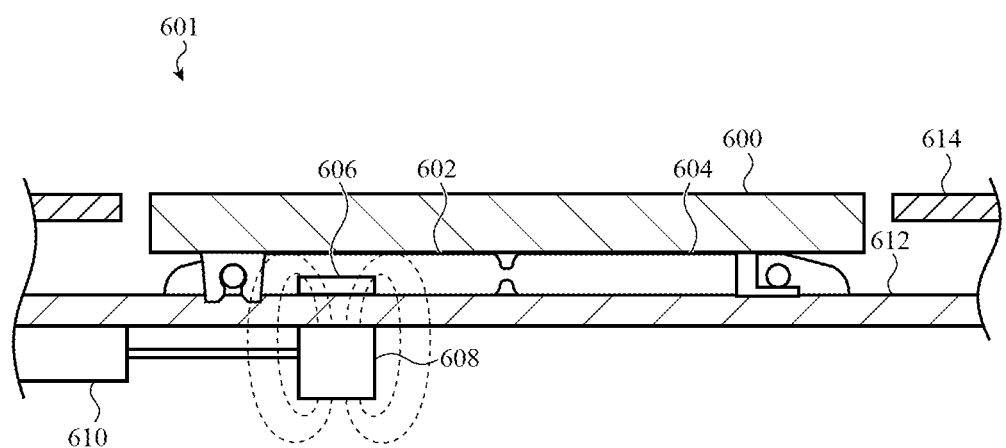
FIG. 6B depicts a partial cross-sectional view of the retractable key mechanism of FIG. 6A in a second mode of operation.

FIG. 6B shows the key mechanism 601 after the actuator 610 has moved the magnet 608 into a second position. In the second position, the magnetic field from the magnet 608 attracts the ferromagnetic component 606 with sufficient force to retract the keycap 600 and maintain the keycap 600 in the retracted position. In order to return the key to a normal operating mode, the actuator 610 may move the magnet 608 back into the first position.

As shown, the actuator 610 is a linear actuator that can push and pull the magnet 608 between the first and second positions. Where a keyboard includes multiple key mechanisms, each key mechanism may be associated with its own actuator. In some cases, instead of using discrete linear actuators for each of multiple keys, the magnets of multiple key mechanisms may be attached to a linkage, shuttle, frame, or other mechanism that can move multiple magnets between first and second positions. In this way, all of the keys of a keyboard may be retracted substantially simultaneously. In such cases, the linkage, shuttle, frame, or other mechanism may be moved by a linear actuator (e.g., an electronic component that converts electrical energy into motion), or by a purely mechanical system. For example, a shuttle may be mechanically linked to a display portion of a notebook computer (e.g., the display portion 102, FIG. 1). When the display portion is moved to a closed position, the shuttle may move the permanent magnets into a position that results in the retraction of the keycaps. When the display portion is moved to an open position, the shuttle may move the permanent magnets into a position that results in the keycaps being released from the retracted position. In another example, the shuttle may be manually actuated by a user by sliding a lever to cause the keys to retract or extend.

Figure 7A:
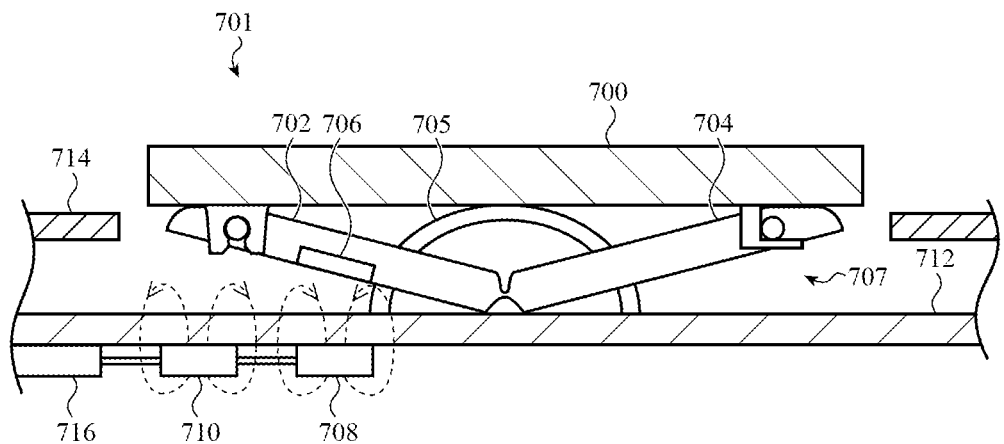
FIG. 7A depicts a partial cross-sectional view of another example retractable key mechanism in a first mode of operation.
Figure 7B:
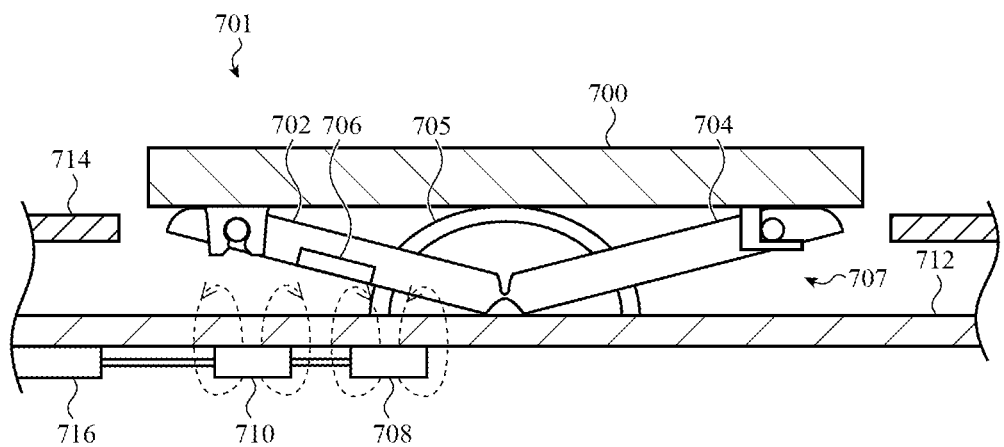
FIG. 7B depicts a partial cross-sectional view of the example retractable key mechanism of FIG. 7A in a second mode of operation.
Figure 7C:
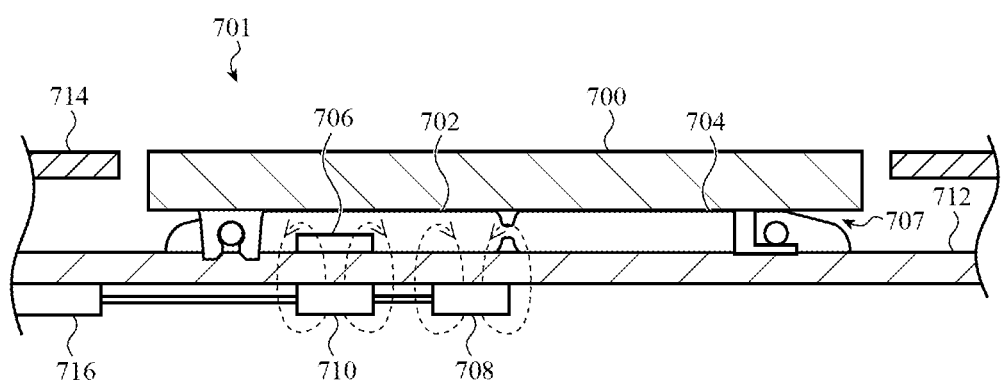
FIG. 7C depicts a partial cross-sectional view of the example retractable key mechanism of FIG. 7A in a third mode of operation.

As noted above, in some cases, a selectively magnetizable magnet system may be used to attract a ferromagnetic component to retract a key, as well as to repel a ferromagnetic component (e.g., a permanent magnet). Repelling a ferromagnetic component may be useful to provide or increase the biasing force of a key mechanism, for example. Attractive and repulsive forces may also be achieved with permanent magnets. FIGS. 7A-7C are partial cross-sectional views of a keyboard that uses movable permanent magnets to, in a first configuration, attract a ferromagnetic component and, in a second configuration, repel a ferromagnetic component.

As shown in FIG. 7A, a key mechanism 701 may include a keycap 700 that, in an extended position, extends or protrudes above a key web 714. Like other key mechanisms described herein, the keycap 700 may be movably supported above a substrate or support structure (here a substrate 712) by a keycap support mechanism 707 that includes arms 702, 704. Because the key mechanism 701 is configured to have magnetic forces applied in opposing directions (e.g., forcing the keycap 700 both down and up), the key mechanism 701 also includes at least one first permanent magnet 706. In particular, the key mechanism may use a permanent magnet instead of an unmagnetized ferromagnetic material. Accordingly, the permanent magnet may be either repelled from or attracted to another magnet, depending on the relative polarities of the magnets. By contrast, an unmagnetized ferromagnetic material may not be able to be repelled by another magnet, as it may be attracted to any magnetic field regardless of the polarity of the magnetic field. The permanent magnet 706 may be incorporated with the keycap 700 or the keycap support mechanism 707. As shown, it is connected to an arm 704 of the keycap support mechanism 707.

The key mechanism 701 may also include a second permanent magnet 708 having a particular polarity and a third permanent magnet 710 having an opposite polarity to the second permanent magnet 708. The second and third magnets 708, 710 may be movable by an actuator 716 (as shown) between two or more positions. In a first position, the second permanent magnet 708 may be proximate the first permanent magnet 706 such that the first permanent magnet 706 is repelled from the second permanent magnet 708. The repulsion force may tend to force the keycap 700 towards the extended or unactuated position. The repulsion force may be used instead of a mechanical biasing mechanism (e.g., spring, collapsible dome, etc.) to bias the keycap 700 towards the extended position. Alternatively, the repulsion force may be used in conjunction with a mechanical biasing mechanism to increase or modify the force required to actuate the key.

FIG. 7B shows the second and third magnets 708, 710 in an intermediate position, where neither the second nor the third magnets 708, 710 are in a position to attract or repel the first permanent magnet 706. This position may be used in cases where the key mechanism 701 includes a mechanical biasing mechanism such as a spring or collapsible dome. For example, when the second and third magnets are in the intermediate position, the key mechanism 701 may be substantially free of magnetic influences and may operate in a normal operating mode with a normal force response (e.g., unmodified by the magnets).

FIG. 7C shows the second and third magnets 708, 710 in a second position, where the third permanent magnet 710 is in a position relative to the first permanent magnet 706 such that the first permanent magnet 706 is attracted the third permanent magnet 710, and the second permanent magnet 708 is sufficiently remote from the first permanent magnet 706 that it does not interfere with or overpower the attractive force between the first and third magnets 706, 710. In the second position, the third permanent magnet 710 may retract and maintain the keycap 700 in the retracted position, as described herein.

Similar to the discussion with respect to FIGS. 6A-6B, the second and third magnets 708, 710 may be moved by a shuttle, linkage, frame, or other mechanical system that may be actuated by the movement of a display portion, a lever, or another affordance.

Figure 8:
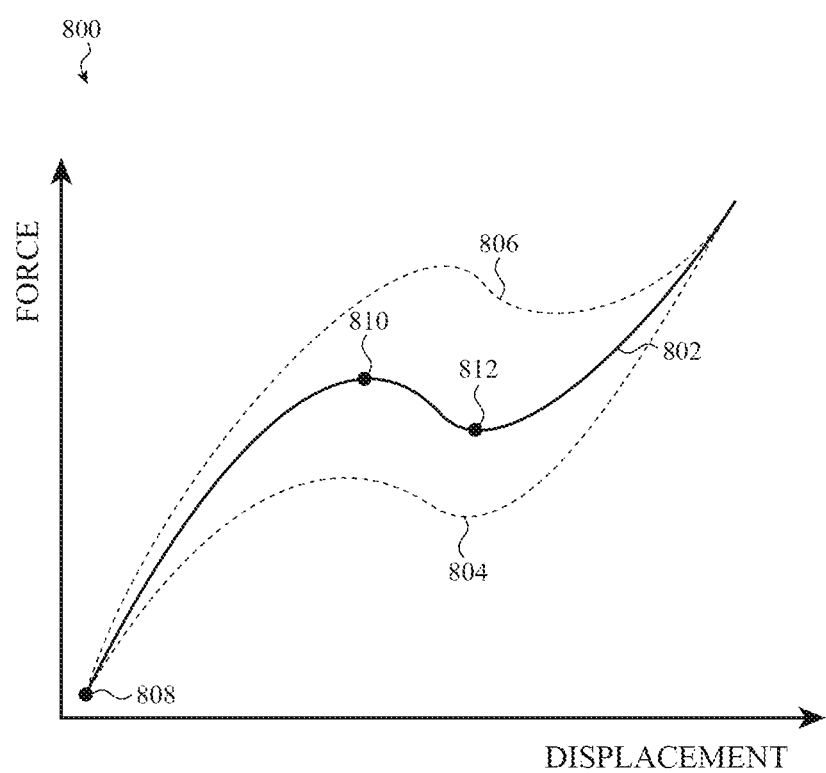
FIG. 8 depicts a force versus displacement plot for an example key mechanism.

FIG. 8 shows a force versus displacement plot 800 for a key mechanism, such as the key mechanism 701 in FIGS. 7A-7C. The force versus displacement plot 800 characterizes or represents the various force responses of the key mechanism 701, depending on the position of the second and third magnets 708, 710. For example, the curve 802 represents a force response of the key mechanism 701 when the second and third magnets 708, 710 are in the intermediate position (FIG. 7B), and the primary (or only) biasing force on the keycap 700 is due to a biasing mechanism (e.g., a spring or collapsible dome).

With respect to the curve 802, as an actuation force causes the keycap 700 to move, the biasing mechanism (e.g., collapsible dome 705) begins to deform and the force response of the key mechanism 701 increases from point 808 until a pressure point 810 is reached. The pressure point 810 may correspond to a point at which a rapid deformation of the biasing mechanism begins (e.g., corresponding to a click that may be felt and/or heard by a user).

After the pressure point 810, the responsive force of the key mechanism 701 decreases until the operating point 812 is reached. Under normal operating conditions and forces, the operating point 812 may be at or near a maximum travel of the keycap 700, and may correspond to the key or the device with which the key is incorporated registering an actuation of the key. In some cases, the key or device registers an actuation of the key somewhere between the pressure point 810 and the operating point 812.

The curve 806 represents a force response of the key mechanism 701 when the second permanent magnet 708 is repelling the first permanent magnet 706. In particular, the repelling force experienced by the first permanent magnet 706 due to the opposing polarities of the first permanent magnet 706 and the second permanent magnet 708 increases the amount of force required to press the key to the actuated position.

The curve 804 represents yet another force response that may be possible in some example key mechanisms. In particular, in some cases, a key mechanism may be configured to apply a retracting force to the keycap that can reduce the force required to actuate a key, but which does not actually retract the keycap or maintain the keycap in a retracted or depressed position even once the keycap is depressed by a user. For example, in the case of a key with a selectively magnetizable magnet system and a permanent magnet attached to the keycap support mechanism or the keycap, the magnetizable material of the selectively magnetizable magnet system may be magnetized to produce a persistent field that is less than that which would retract and hold the key, but which still opposes the biasing force from a biasing mechanism. This may also be achieved with two permanent magnets. For example, in the example shown in FIGS. 7A-7B, the key mechanism 701 may include a fourth magnet having the same polarity as the third permanent magnet 710 but with a weaker magnetic field. The weaker magnetic field may oppose the biasing force from the biasing mechanism and thus lower the actuation force of the key, as represented by the curve 804.

While the force response curves shown in FIG. 8 may be produced using permanent magnets, they may also be achieved using a selectively magnetizable magnet system, as described above. For example, by magnetizing the magnetizable material of the selectively magnetizable magnet system to produce persistent magnetic fields of different strengths, different force responses may be achieved, including those shown in FIG. 8, or others (including responses that are between the curves shown).

Figure 9A:
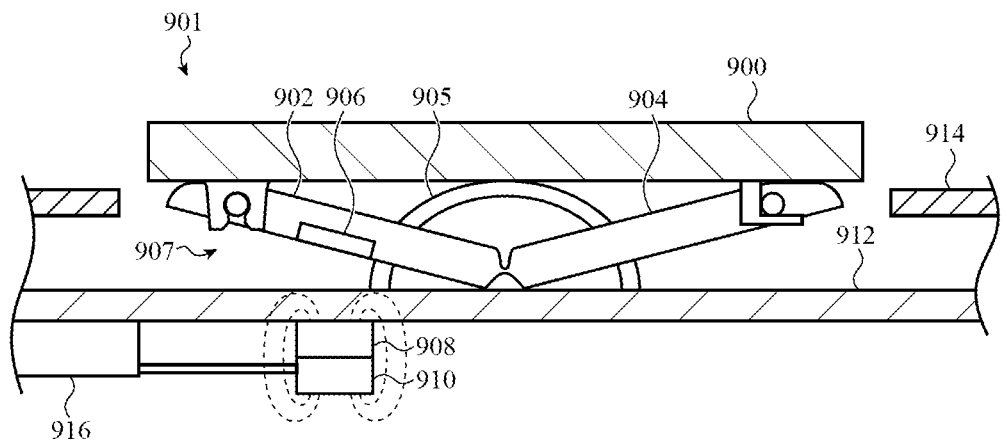
FIG. 9A depicts a partial cross-sectional view of another example retractable key mechanism in a first mode of operation.
Figure 9B:
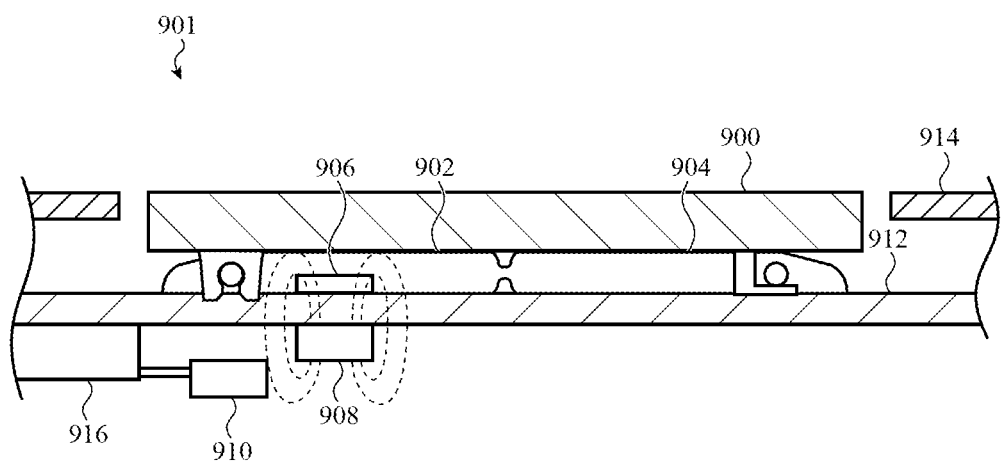
FIG. 9B depicts a partial cross-sectional view of the retractable key mechanism of FIG. 9A in a second mode of operation.

Instead of or in addition to moving permanent magnets between various positions relative to a ferromagnetic component, similar results may be achieved by positioning a permanent magnet in a static position and moving a shunt between various positions to change the strength, location, or concentration (or any other suitable property) of the magnetic field produced by the permanent magnet. FIGS. 9A-9B are partial cross-sectional views of a keyboard that uses a movable shunt (e.g., a piece of metal) to adjust the magnitude of the retraction force applied to the keycap. As used herein, a "shunt" is a part or piece that directs (or redirects) a magnetic field. Put another way, a shunt channels a magnetic field; the magnetic field will extend further or differently in the absence of the shunt. It should be appreciated that certain shunts described herein are movable, as mentioned above.

As shown in FIG. 9A, a key mechanism 901 may include a keycap 900 that, in an extended position, extends or protrudes above a key web 914. Like other key mechanisms described herein, the keycap 900 may be movably supported relative to (e.g., above) a substrate or support structure (here a substrate 912) by a keycap support mechanism 907 that includes arms 902, 904. The key mechanism 901 also includes a ferromagnetic component 906, which may be a non-magnetized ferromagnetic material (e.g., a soft magnetic material) or a permanent magnet (e.g., a hard magnetic material), as described herein. The ferromagnetic component 906 may be incorporated with the keycap 900 or the keycap support mechanism 907. As shown, it is connected to an arm 904 of the keycap support mechanism 907.

The key mechanism 901 may also include a permanent magnet 908 and a movable shunt 910. The movable shunt 910 may be movable by an actuator 916 between a first position, shown in FIG. 9A, and a second position, shown in FIG. 9B. In the first position, the shunt 910 is positioned relative to the permanent magnet 908 such that the magnetic field of the permanent magnet 908 does not substantially interact with the ferromagnetic component 906. Thus, the keycap 900 may be allowed to move between an extended and a retracted position (e.g., providing a normal key operation), despite the proximity of the permanent magnet 908 to the ferromagnetic component 906.

In the second position, as shown in FIG. 9B, the shunt 910 is in a second position that is more distant from the permanent magnet 908, as compared to the first position (e.g., the shunt is closer to the permanent magnet in the first position than it is in the second position). When the shunt 910 is in the second position, the magnetic field of the permanent magnet 908 interacts with the ferromagnetic component 906 to retract the keycap 900 and/or maintain the keycap 900 in the retracted position.

While the foregoing discussion describes various ways in which magnets may be moved between various discrete positions or a selectively magnetizable material may be magnetized to have various discrete field strengths, the same or similar systems and techniques may be used to produce a more continuous range of force responses. For example, instead of simply sliding permanent magnets or shunts between two discrete positions (as described with respect to FIGS. 6A-7C and 9A-9B), the permanent magnets or shunts may be positionable at various positions between the terminal positions described above. Similarly, a magnetizable material may be magnetized to produce persistent magnetic fields of various strengths. Such variability may allow more granular adjustments of the force response of keys or other input mechanisms, including reducing or increasing the force required to actuate a key in addition to retracting the key and maintaining the key in a retracted position.

In some cases, instead of or in addition to magnetic key retraction systems and techniques, input devices may use piezoelectric actuators to selectively retract actuation members. For example, FIGS. 10A-10B are partial cross-sectional views of a keyboard that uses a piezoelectric actuator attached to a keycap to retract the keycap under certain operating conditions or modes.

Figure 10A:
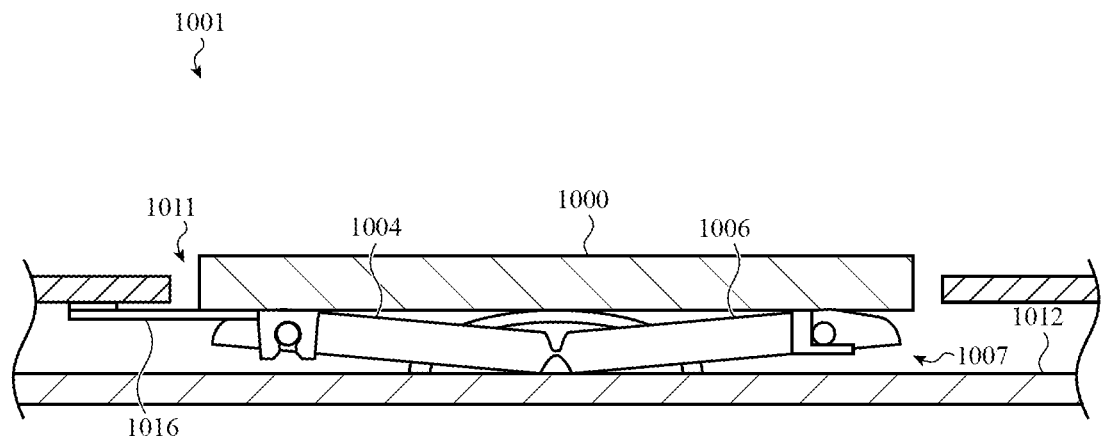
FIG. 10A depicts a partial cross-sectional view of an example retractable key mechanism using a piezoelectric actuator in a first mode of operation.
Figure 10B:
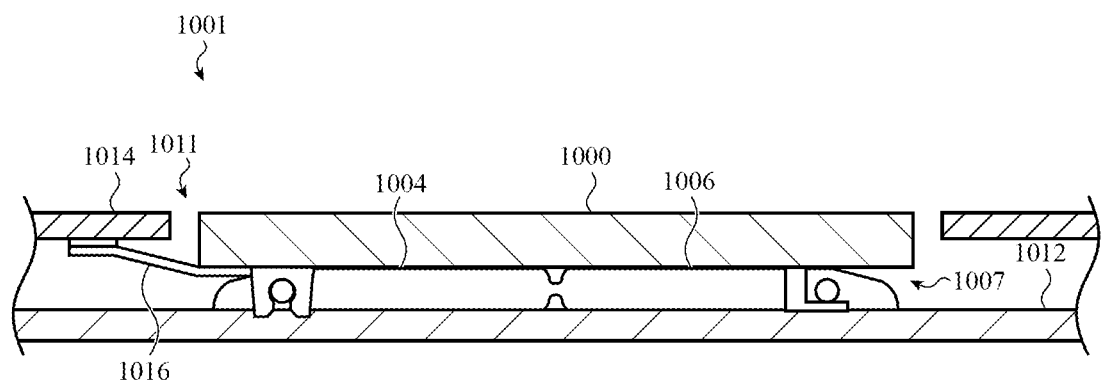
FIG. 10B depicts a partial cross-sectional view of the retractable key mechanism of FIG. 10A in a second mode of operation.

As shown in FIG. 10A, a key mechanism 1001 may include a keycap 1000 that, in an extended position, extends or protrudes above a key web 1014. Like other key mechanisms described herein, the keycap 1000 may be movably supported relative to (e.g., above) a substrate or support structure (here a substrate 1012) by a keycap support mechanism 1007, similar to other keycap support mechanisms described herein.

The key mechanism 1001 also includes a piezoelectric actuator 1016 attached to the keycap 1000. The piezoelectric actuator 1016 may be any suitable piezoelectric component that can bend, flex, or otherwise deform or deflect to apply a retraction force to the keycap 1000. In some cases, the piezoelectric actuator 1016 may include a piezoelectric material applied to a beam, spring, or other structural component. In other cases, the piezoelectric actuator 1016 is a monolithic piezoelectric material. The piezoelectric material may be attached or applied to any portion of the structural component (e.g., a beam or spring) of the piezoelectric actuator 1016. For example, the piezoelectric material may be positioned along an entire length of the structural component, or only over a lesser portion of the structural component (e.g., at or near the middle of the structural component and not under the portions attached to the key web and keycap).

The piezoelectric actuator 1016 may be attached to the keycap 1000 in any suitable way. For example, a surface at a distal end 1011 may be adhered, bonded, fastened, or otherwise fixed to the keycap 1000, as shown in FIGS. 10A-10B. As another example, it may be pivotally coupled to the keycap 1000. Pivotally coupling the piezoelectric actuator 1016 to the keycap may allow for a greater deflection of the keycap 1000 than adhesion or other fixed mountings, as the piezoelectric actuator 1016 (and/or an associated beam, spring, or other structural component) may not need to bend or flex in as many directions, or may have larger bend radii (and thus may be less resistant to bending).

The piezoelectric actuator 1016 may be connected to a voltage source. When a first voltage is applied to the piezoelectric actuator 1016 (or when no voltage is applied), the actuator 1016 may have one shape, and when a second voltage (which may be nonzero and different from the first voltage) is applied, the actuator 1016 may have a different shape. The difference in the shapes of the piezoelectric actuator 1016 with different voltages may be leveraged to move the keycap 1000 between a retracted position and an extended position.

As shown in FIG. 10A, the keycap 1000 is in an extended position, and may be free to move between the extended position and the retracted position (e.g., providing a normal key operation). The piezoelectric actuator 1016 may be connected to the key web 1014 (or any other suitable portion of a keyboard or other input device) as well as the keycap 1000. As such, the piezoelectric actuator 1016 may be sufficiently flexible, that when the first voltage (or no voltage) is applied the keycap 1000 may move between the extended and retracted positions without substantial interference or biasing force from the piezoelectric actuator 1016. In some cases, however, the piezoelectric actuator 1016 provides a biasing force to the keycap 1000 when the first voltage (or no voltage) is applied to the piezoelectric actuator 1016. In such cases, the key mechanism 1001 may use a collapsible dome that provides less biasing force (as compared to a key mechanism without the piezoelectric actuator 1016), so that the combination of the biasing force from the piezoelectric actuator 1016 and the collapsible dome are substantially similar to a typical key mechanism. In some cases, the key mechanism 1001 may rely only on the biasing force provided by the piezoelectric actuator 1016.

FIG. 10B shows the key mechanism 1001 when the keycap 1000 is in a retracted position. In this state, the second voltage may be applied to the piezoelectric actuator 1016 to cause the actuator 1016 to deform or deflect downwards, thus retracting the keycap 1000 and retaining the keycap 1000 in the retracted position. In some cases, the piezoelectric actuator 1016 is bistable, such that it can remain in the second orientation (FIG. 10B) without a continuous application of electrical power.

Figure 11A:
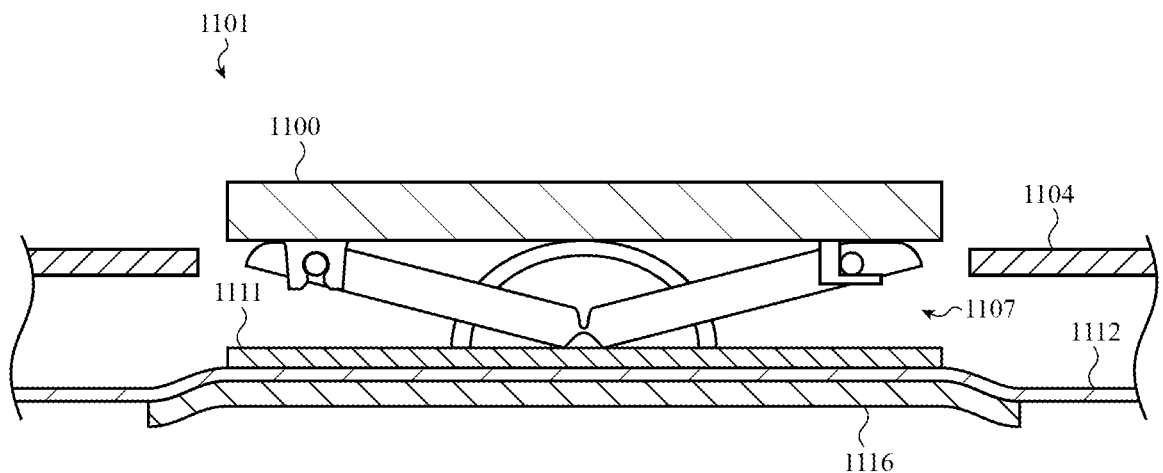
FIG. 11A depicts a partial cross-sectional view of another example retractable key mechanism using a piezoelectric actuator in a first mode of operation.
Figure 11B:
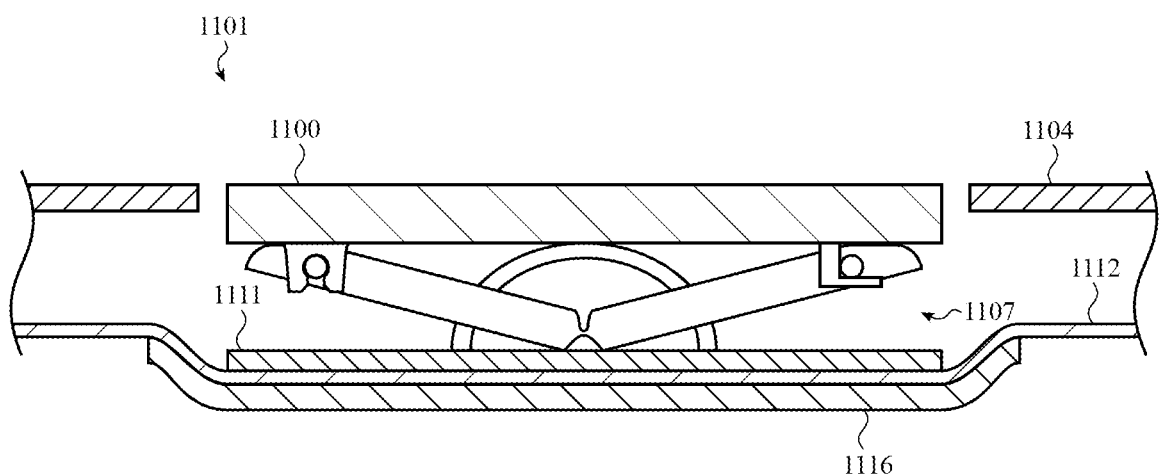
FIG. 11B depicts a partial cross-sectional view of the retractable key mechanism of FIG. 11A in a second mode of operation.

FIGS. 11A-11B depict partial cross-sectional views of another keyboard that uses a piezoelectric actuator to retract the keycap under certain operating conditions or modes. While the key mechanism 1001 shown in FIGS. 10A-10B has a piezoelectric actuator attached to a keycap and a key web to directly force the keycap into the retracted position, the key mechanism 1101 shown in FIGS. 11A-11B positions a piezoelectric actuator below the keycap support mechanism to move the keycap between the retracted (e.g., storage) and extended (e.g., operational) positions.

As shown in FIG. 11A, a key mechanism 1101 may include a keycap 1100 that, in an extended position, extends or protrudes above a key web 1114. Like other key mechanisms described herein, the keycap 1100 may be movably supported relative to (e.g., above) a substrate or support structure (here a substrate 1112) by a keycap support mechanism 1107, similar to other keycap support mechanism described herein.

The key mechanism 1101 also includes a piezoelectric actuator 1116 attached to a substrate 1112. The substrate 1112 may be formed from any suitable material (e.g., glass, metal, plastic, etc.) and may include a contoured region on which a key support 1111 may be attached. The key support 1111 may be a printed circuit board, having similar structural and electrical functions as the substrate 303 described above. Further, the keycap support mechanism 1107 may be coupled directly to the key support 1111, or via a support body (e.g., similar to the support body 309, described above). The key support 1111 may be electrically interconnected to other components of a device (e.g., a processor, key supports of other keys, etc.) via flex circuits, wires, or any other suitable connection technique. Accordingly, multiple key supports of multiple key mechanisms may be electrically interconnected or otherwise cooperate to provide a keyboard system with multiple keys.

The contoured region may be bistable, having both a convex configuration (FIG. 11A) and a concave configuration (FIG. 11B). Because of the bistability, the contoured region may remain in one configuration (e.g., the concave or convex configuration) until an external force or impetus is provided to move the contoured region into the other configuration.

The piezoelectric actuator 1116 may be configured to provide the impetus to the contoured region to change the contoured region from the convex to the concave position (and vice versa). For example, when a first voltage is applied to the piezoelectric actuator 1116, the actuator 1116 may deform in a way that transitions the contoured region from the convex configuration to the concave configuration. When the first voltage is removed, the contoured region may remain in the concave configuration without continued application of voltage. When a second voltage is applied to the piezoelectric actuator 1116, the actuator 1116 may deform in a way that transitions the contoured region from the concave configuration to the convex configuration. When the second voltage is removed, the contoured region may remain in the convex configuration without continued application of voltage.

When the contoured region is in the concave configuration (FIG. 11B), the top surface of the keycap 1100 may be substantially flush with respect to the key web 1114 (or otherwise retracted relative to the position of the keycap 1100 when the contoured region is in the convex configuration). Moreover, because the keycap 1100 is not held in the depressed position when the keycap 1100 is retracted (e.g., a collapsible dome or other switch mechanism is not in an "actuated" state), the key mechanism 1101 may be fully operable even when the keycap 1100 is retracted from its normal operating position (e.g., its extended position). A bistable substrate such as that shown in FIGS. 11A-11B may also be implemented with any of the magnetic actuation techniques described above. For example, a permanent magnet may be attached to the contoured region, and a selectively magnetizable magnet system or one or more additional permanent magnets may be used to force the contoured region to transition between the convex and concave configurations.

Like the piezoelectric actuator 1016, the piezoelectric actuator 1116 may be any suitable piezoelectric component that can bend, flex, or otherwise deform or deflect to invert the contoured region. The piezoelectric actuator 1116 may be connected to a voltage source. When a first voltage is applied to the piezoelectric actuator 1116, the piezoelectric actuator 1116 may cause the contoured region to change from a convex configuration to a concave configuration. When a second voltage (different from the first voltage) is applied, the piezoelectric actuator 1116 may cause the contoured region to change from a concave configuration to a convex configuration.

While the foregoing examples show individual instances of key mechanisms, it will be understood that a keyboard may include multiple key mechanisms each having the same or similar configurations. In some cases, all of the keys of a keyboard may have one or another of the mechanisms described herein. In other cases, only a subset of the keys of a keyboard may include mechanisms for selectively retracting the keys.

The foregoing examples relate primarily to keys for keyboards, similar systems and techniques may be used to provide selective retractability to other types of input devices and for other types of electronic devices. For example, FIGS. 12A-12B show an example input device of a handheld electronic device that uses a selectively magnetizable magnet system to allow an actuation member to operate in multiple modes of operation, as described herein.

Figure 12A:
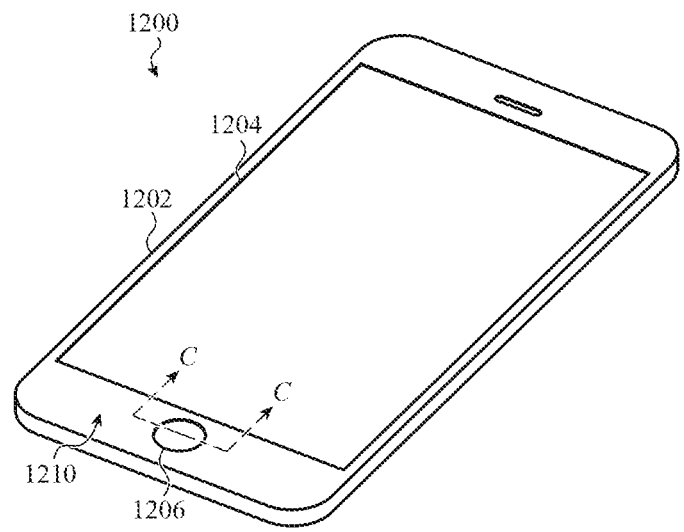
FIG. 12A depicts an example electronic device having a retractable input device.
Figure 12B:
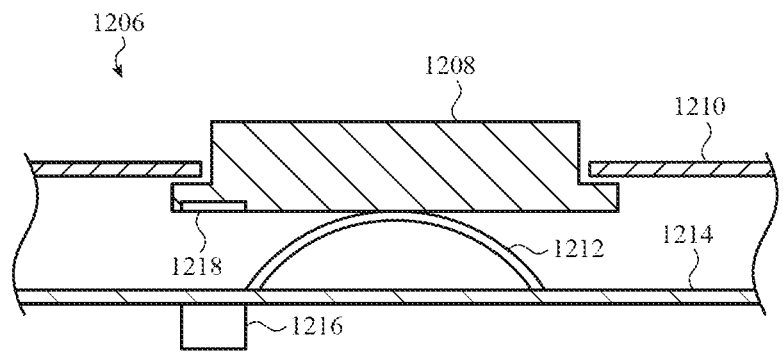
FIGS. 12B-12C depict partial cross-sectional views of the electronic device of FIG. 10A in first and second modes of operation, respectively.

FIG. 12A depicts an example electronic device 1200 that may include an input device with a retractable actuation member. The electronic device 1200 is depicted as a mobile phone (e.g., a smartphone), though this is merely one example electronic device that may incorporate an input device (e.g., button) with a retractable actuation member as described herein.

The electronic device 1200 includes an enclosure 1202 and a cover 1210. The cover 1210 may be a glass, plastic, ceramic, or other substantially transparent material, component, or assembly, attached to the enclosure 1202. The enclosure 1202 may include a back and sides that cooperate to at least partially define an interior volume of the device 1200, and may be formed of glass, metal, carbon fiber, ceramic, or any other suitable material.

The cover 1210 may cover or otherwise overlie a display 1204 and/or a touch sensitive surface (e.g., a touchscreen), and may define a front face and an input surface of the electronic device 1200. For example, a user may operate the device 1200 by touching the input surface to select affordances displayed on the display 1204 (e.g., icons, virtual keys, etc.). The electronic device 1200 may also include an input device 1206. The input device 1206 may be used to control an operation of the device 1200 or otherwise cause the device 1200 to perform various functions. The input device 1206 (or an actuation member of the input device 1206) may be selectively retractable, similar to the keys described with respect to the foregoing figures. For example, an actuation member of the input device 1206 may be configured to protrude from the cover 1210 when the device is in use, and to be retracted (e.g., flush with the cover 1210) when the device is not in use.

FIG. 12B is a partial cross-sectional view of the electronic device 1200, viewed along line C-C in FIG. 12A, showing details of the input device 1206. In particular, the input device 1206 includes an actuation member 1208 (e.g., a push-button actuator) that extends above a surface of the cover 1210. The actuation member 1208 may have flanges or other features that retain the actuation member 1208 in the opening and define the distance that the actuation member 1208 can extend beyond or above the surface of the cover 1210.

The input device 1206 may also include a collapsible dome 1212, which may provide a biasing force to bias the actuation member 1208 towards an unactuated position. The collapsible dome 1212 may also provide electrical switching functionality to allow the device 1200 to detect when the actuation member 1208 has been pressed, and to cause the device 1200 to take an action or perform a function. While the input device 1206 is shown with a collapsible dome 1212, other biasing mechanisms may also be used, such as coil springs, flat springs, elastomeric members, or the like. The collapsible dome 1212 may rest on a support structure 1214, which may provide a suitably rigid support to allow the collapsible dome 1212 to bias the actuation member 1208 toward the unactuated position and to allow the collapsible dome 1212 to be collapsed or deformed between the actuation member 1208 and the support structure 1214 when the actuation member 1208 is pressed. The support structure 1214 may be any component, structure, substrate, or the like. For example, the support structure 1214 may be a printed circuit board, a metal plate, a plastic plate, or the like.

The input device 1206 may also include a ferromagnetic component 1218 incorporated with the actuation member 1208. The ferromagnetic component 1218 may be similar to any of the ferromagnetic components described above. For example, the ferromagnetic component 1218 may be a non-magnetized ferromagnetic material, or a permanent magnet. As shown, the ferromagnetic component 1218 is attached to the actuation member 1208 via any suitable technique, such as adhesives, mechanical retainers, encapsulation (e.g., insert molding), or the like. In some cases, however, the ferromagnetic component 1218 is incorporated with or attached to another structure or component of the input device 1206, such as any structure or component that will produce a desired retraction force on the actuation member 1208 when the ferromagnetic component 1218 is influenced by a magnetic field.

The input device 1206 also includes a selectively magnetizable magnet system 1216 positioned relative to the ferromagnetic component 1218 to attract (or repel) the ferromagnetic component 1218 when magnetized. The selectively magnetizable magnet system 1216 may be the same or substantially similar to the selectively magnetizable magnet systems discussed above with respect to FIGS. 3A-5B, and may be coupled to the support structure 1214 (or any other structure or component of the device 1200) below the ferromagnetic component 1218.

Like the selectively magnetizable magnet systems discussed above, the selectively magnetizable magnet system 1216 may be configured to operate in several modes. For example, in a first mode, the selectively magnetizable magnet system 1216 may allow the actuation member 1208 to move between an extended position (FIG. 12B) and a retracted position. For example, the actuation member 1208 may act as a button that can be depressed by a user, and then return to its unactuated state. In this mode, the magnetizable material of the selectively magnetizable magnet system 1216 may be substantially unmagnetized and produce little to no magnetic field, or a magnetic field that is small enough not to interfere substantially with the function and feel of the input device 1206.

In a second mode, the magnetizable material of the selectively magnetizable magnet system 1216 may be magnetized to magnetically attract the ferromagnetic component 1218 and retract the actuation member 1208 into the retracted position, and maintain the actuation member 1208 in the retracted position. For example, the magnetic material of the selectively magnetizable magnet system 1216 may be magnetized to magnetically attract the ferromagnetic component 1218 with sufficient force to overcome the biasing force of the dome 1212 (or any biasing mechanism associated with the actuation member 1208) and pull the actuation member 1208 into the retracted position. FIG. 12B shows the magnetizable material of the selectively magnetizable magnet system 1216 having been magnetized to retract the actuation member 1208.

The foregoing modes of operation of the input device 1206 may be activated in response to the detection of particular states of the device 1200. For example, the actuation member 1208 may be extended (e.g., in a normal operating mode) when the device 1200 determines that it is in use or about to be used. This may be determined in any suitable way, such as with touch sensors, accelerometers, motion sensors, light sensors, or the like. For example, the device 1200 may determine, based on one or more sensor inputs, that the device 1200 is being held by a user. In such cases, the device 1200 may cause the selectively magnetizable magnet system 1216 to operate in the first mode, thereby extending the actuation member 1208. If the device 1200 determines that it is not being held by a user (e.g., it is resting on a desk, on a docking station, in a pocket or purse, or the like), or is otherwise inactive, it may cause the selectively magnetizable magnet system 1216 to operate in the second mode, retracting the actuation member 1208 so that it is flush with or recessed relative to the cover 1210 (or otherwise extends less than in the first mode). This may help prevent the actuation member 1208 from catching or snagging on objects and may help prevent damage to the actuation member 1208 when the device is not in use, while still providing an easily detectable tactile button surface for users when the device is in use.

Figure 12C:
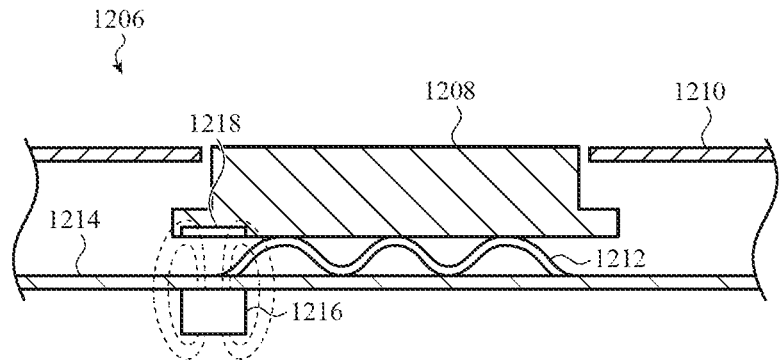

While FIGS. 12B-12C describe a selectively magnetizable magnet system having two discrete modes of operation, other magnet configurations and modes of operation are also possible. For example, the device 1200 may use movable permanent magnets and/or shunts to allow the actuation member 1208 to operate in the modes described above (e.g., an operating mode and a retracted mode). Movable permanent magnets and shunts are described above. Similarly, instead of two discrete modes, the selectively magnetizable magnet system 1216, or movable permanent magnets if used, may be used to produce a range of different forces on the actuation member 1208, as described above.

Instead of or in addition to using magnetic attraction (and optionally repulsion), other techniques may be used to manipulate the height of keycaps or other actuation members. For example, as noted above, keycaps may be retracted in response to the rotation of a display relative to a base portion of a notebook computer (e.g., when the notebook computer is being closed). Accordingly, in some cases a mechanical shuttle, linkage, frame, or other mechanism mechanically couples the keycaps (or other suitable components of the key mechanisms) to the display portion. Thus, when the display portion is rotated towards the closed position, the keycaps may be mechanically forced to the retracted position. When the display portion is rotated towards the open position, the keycaps may be returned to the extended position. In another example, instead of mechanically linking the keycaps to the display portion, they are linked to a mechanical switch or other affordance that a user can manually manipulate to change the mode of the keyboard (e.g., to retract or extend the keys).

In yet other examples, key mechanisms or other input devices may include mechanical detents or latches that allow a user to manually retract or extend keys or input devices. For example, the key mechanism may include mechanical latches that are activated when a user forces the keycaps into a recessed position. More particularly, the key mechanisms (or any input device) may be configured so that when subjected to forces lower than a particular threshold (e.g., representative of typical typing or actuation), the keycap or other actuation member returns to an extended position after actuation. When subjected to forces above the particular threshold (e.g., representative of a force above a typical typing or actuation force), the latch or detent may be engaged to maintain the keycap or other actuation member in a recessed position. In some cases, latches or detents may be engaged by other forces or influences than a user manually pressing the keycap or actuation member. For example, electromechanical actuators may be used to retract the keys and/or engage the latches or detents.

The foregoing discussion shows retraction systems and techniques for retracting individual keys, buttons, and other input devices. As noted above, multiple of such input devices may be provided in a single electronic device, such as a keyboard that includes multiple keys that can be selectively retracted or extended, or a handheld electronic device (e.g., smartphone) with multiple selectively retractable buttons. As such, the input devices may be operated together or independently to provide different functionalities. FIGS. 13B-13C illustrate example use cases of the keyboard 108 (FIG. 1) where the keys need not be uniformly in the same mode or position.

Figure 13A:
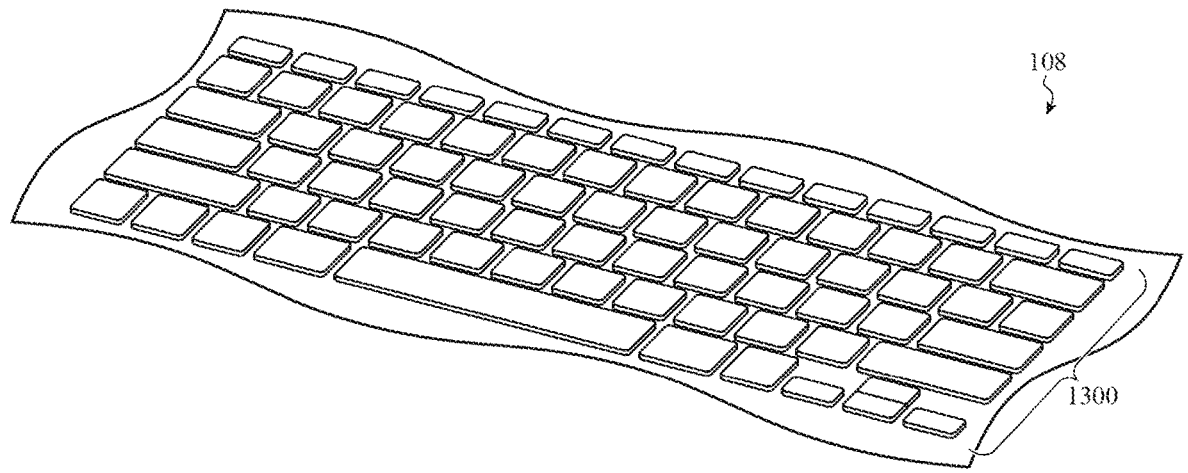
FIGS. 13A-13C depict an example keyboard with retractable key mechanisms in various states of operation.
Figure 13B:
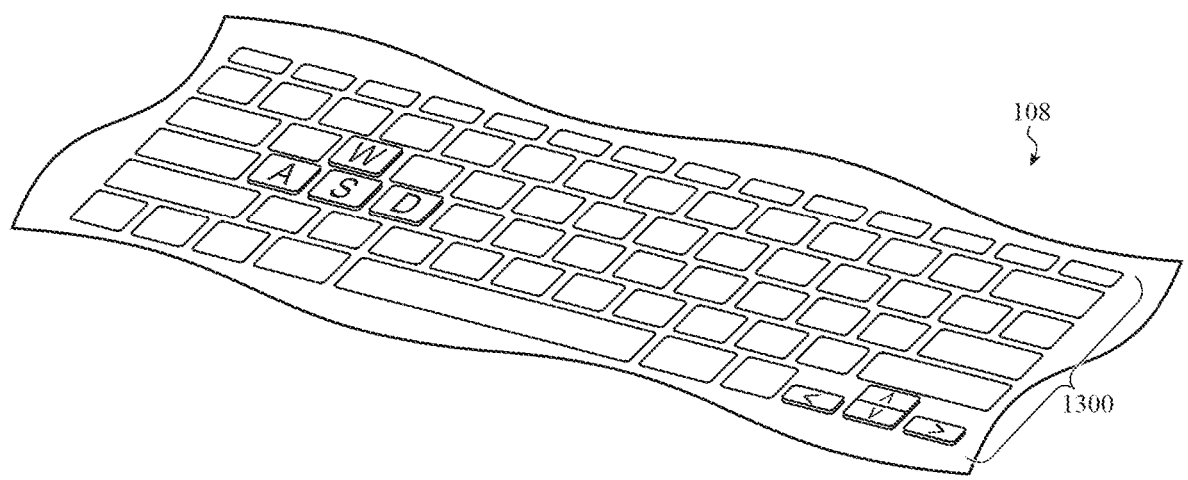
Figure 13C:
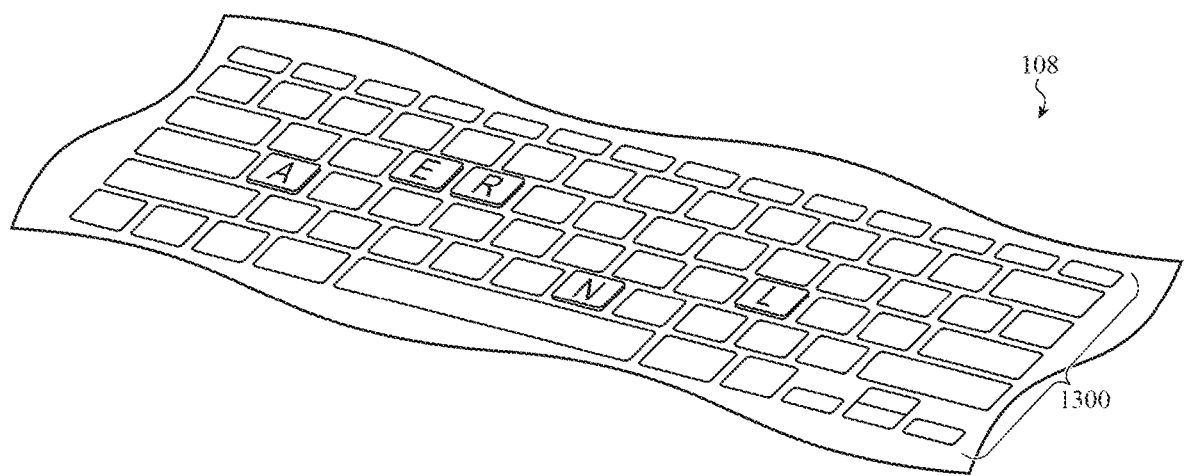

FIG. 13A shows the keyboard 108 with all keys 1300 in a normal operating mode. For example, all of the keys 1300 are shown in an extended position, which may signify to a user that all keys 1300 are active and are capable of accepting inputs. This may correspond to a typical operating mode for a keyboard, in which a user may depress any of the keys of the keyboard.

FIG. 13B shows the keyboard 108 in a state where only those of the keys 1300 that are currently able to accept inputs (or for which an actuation will result in the device associated with the keyboard 108 taking an action or performing a function) are extended or in a normal mode of operation. For example, FIG. 13B shows the W, A, S, and D letter keys, as well as the arrow keys, in a normal operating mode, while all other keys are in a retracted mode. The extended keys may correspond to keys that are active when an associated computer is in a gaming mode and these keys are the only keys to which the game will respond. Of course, other modes, applications, or functions may use other key combinations. For example, when an associated device is executing a word processing application, all the letter keys may be extended while other keys (e.g., function keys) are retracted. When the device is executing a calculator application, only the number keys may be extended. Other subsets of the keys may also be extended (and others retracted) as well.

FIG. 13C shows the keyboard 108 being used to teach or guide a user to particular keys. For example, in FIG. 13C, the L, E, A, R, and N keys are extended, which may help guide a user to learn where the letters for the word "learn" are located. While FIG. 13C shows the L, E, A, R, and N keys extended, these keys may be sequentially extended (with all other keys being retracted) to teach a user what keys to select to produce certain results. More particularly, in order to teach a user how to spell or type the word "learn," the keyboard may first extend only the L key. Once the user selects the L key, it may remain in the retracted position, and the E key may be extended (e.g., placed in a normal operating mode). This may continue until the word is completed or the particular pattern is otherwise finished. Similar techniques may be used for training or guiding functions other than teaching typing or spelling. For example, if a dialog box appears on a screen, the keyboard may retract all keys except those that can be used to deal with the dialog box. In another example, where the magnetic key retraction system is capable of producing different force responses for the keys, some keys may be made more difficult to actuate while others may have relatively lower force responses. In this way, users can be guided towards certain keys (e.g., those corresponding to a word being learned), while mistaken or incorrect key selections can be discouraged or prevented.

When keys or key mechanisms are retracted by a key retraction mechanism, such as any of the key retraction mechanisms described herein, the switching functions of those keys may be disabled. In particular, when keycaps are selectively retracted using a magnetic or piezoelectric retraction technique, as described herein, actuation signals or other phenomena indicative of a key being depressed may be ignored, and key functions associated with that key may be not performed. For example, in a normal operating mode (e.g., when a keycap is allowed to move between an extended and a retracted position), depressing a keycap may cause a collapsible dome to collapse, thereby closing an electrical circuit and causing a device (if it is on and accepting inputs) to take some action or perform a function. When keycaps are to be retracted, for example for storage or to direct users to other keys, the device may be configured to not perform a function that may otherwise be caused by actuation of that key. In this way, the selective retraction of keys will not cause the device to perform unexpected or unintended actions.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. For example, while the methods or processes disclosed herein have been described and shown with reference to particular operations performed in a particular order, these operations may be combined, subdivided, or re-ordered to form equivalent methods or processes without departing from the teachings of the present disclosure. Moreover, structures, features, components, materials, steps, processes, or the like, that are described herein with respect to one embodiment may be omitted from that embodiment or incorporated into other embodiments.

What is claimed is:

1. An electronic device, comprising:
an enclosure; and
a keyboard positioned within the enclosure and including:
a substrate; and
a key mechanism including:
a keycap;
a keycap support mechanism having an arm with a first end coupled to the keycap above the substrate and with a second end at the substrate, wherein the arm comprises a ferromagnetic component extending along an entire length of the arm from the first end to the second end; and
a biasing mechanism biasing the keycap away from the substrate; and
a magnet system configured to selectively magnetically attract the ferromagnetic component by changing a magnetic field of the magnet system.

2. The electronic device of claim 1, wherein:
the keycap support mechanism comprises:
a first arm; and
a second arm pivotally coupled to the first arm, wherein the ferromagnetic component is at least part of one of the first arm or the second arm; and
the enclosure comprises:
a base portion housing the keyboard; and
a display portion having a display housed therein, the display portion flexibly coupled to the base portion to enable the display portion to rotate between a closed position and an open position;
the magnet system is demagnetized when the display portion is in the open position, thereby allowing the keycap to move between a retracted position and an extended position;
the magnet system is magnetized when the display portion is in the closed position, thereby magnetically maintaining the keycap in the retracted position;
the biasing mechanism comprises a collapsible dome below the keycap, the collapsible dome operable to output an actuation signal; and
the electronic device is configured to not perform a function associated with the key mechanism in response to the actuation signal when the magnet system is magnetized and the keycap is maintained in the retracted position.

3. The electronic device of claim 1, wherein the magnet system produces a persistent magnetic field that is maintained without a continuous application of electrical power to the magnet system.

4. The electronic device of claim 1, wherein the biasing mechanism comprises a collapsible dome.

5. The electronic device of claim 1, the substrate and the biasing mechanism form an electrical switch to produce actuation signals in response to depressing the keycap.

6. The electronic device of claim 1, wherein the magnet system comprises a magnetizable material and a coil configured to selectively magnetize the magnetizable material and to demagnetize the magnetizable material.

7. A keyboard input device, comprising:
a base structure;
a key mechanism, comprising:
a keycap;
a support mechanism including a ferromagnetic component, the ferromagnetic component being directly coupled to the keycap and to the base structure; and
a collapsible dome positioned between the keycap and the base structure, the collapsible dome biasing the keycap into an extended position relative to the base structure; and
a magnet selectively operable to magnetically attract the ferromagnetic component of the key mechanism into a retracted position relative to the base structure.

8. The keyboard input device of claim 7, wherein the magnet is movable relative to the key mechanism between a first position magnetically attracting the key mechanism into the retracted position and a second position wherein the key mechanism is in the extended position.

9. The keyboard input device of claim 7, wherein the collapsible dome is collapsed in response to the key mechanism being magnetically attracted into the retracted position.

10. The keyboard input device of claim 7, wherein the collapsible dome is operable as a switch to register an actuation of the key mechanism.

11. The keyboard input device of claim 10, wherein the switch is disabled in response to the magnet being operated to magnetically attract the ferromagnetic component of the key mechanism into the retracted position.

12. The keyboard input device of claim 7, wherein the ferromagnetic component is a pivotable ferromagnetic arm, wherein the magnet is selectively operable to magnetically attract the pivotable ferromagnetic arm into the retracted position.

13. The keyboard input device of claim 7, wherein the magnet comprises a magnetizable material and a coil to selectively magnetize the magnetizable material or demagnetize the magnetizable material.

14. An electronic device, comprising:
an enclosure having a display portion and a base portion;
a display device in the display portion;
a keycap positioned within the base portion;
a substrate positioned in the base portion;
a ferromagnetic component having a first end coupled to the keycap and a second end coupled to the substrate, wherein the ferromagnetic component comprises a ferromagnetic material extending from the first end to the second end;
a collapsible dome positioned between the keycap and the base portion; and
an adjustable magnet below the ferromagnetic component, wherein:
with the display portion in a closed position relative to the base portion, the adjustable magnet retracts the keycap relative to the base portion via magnetic attraction between the adjustable magnet and the ferromagnetic component; and
with the display portion in an open position relative to the base portion, the keycap is biased to an extended position relative to the base portion by the collapsible dome.

15. The electronic device of claim 14, wherein the collapsible dome is operable as a switch to register a movement of the keycap.

16. The electronic device of claim 15, wherein the switch is disabled in response to the display portion being in the closed position.

17. The electronic device of claim 15, wherein the switch is disabled in response to the adjustable magnet retracting the keycap relative to the base portion.

18. The electronic device of claim 14, wherein the ferromagnetic component comprises an arm formed from the ferromagnetic material.

19. The electronic device of claim 14, wherein the ferromagnetic component comprises a scissor mechanism.

* * * * *